United States Patent [19]

Travis, Jr. et al.

[11] Patent Number: 5,280,610
[45] Date of Patent: Jan. 18, 1994

[54] METHODS AND APPARATUS FOR IMPLEMENTING DATA BASES TO PROVIDE OBJECT-ORIENTED INVOCATION OF APPLICATIONS

[75] Inventors: Robert L. Travis, Jr., Concord, Mass.; Andrew P. Wilson, Burghfield Common, England; Neal F. Jacobson, Nashua, N.H.; Michael J. Renzullo, Ashland; Alan N. Ewald, Ashby, both of Mass.

[73] Assignee: Digital Equipment Corporation, Maynard, Mass.

[21] Appl. No.: 567,298

[22] Filed: Aug. 14, 1990

[51] Int. Cl.$^5$ ................... G06F 15/40; G06F 12/00
[52] U.S. Cl. ..................... 395/600; 395/650; 395/700; 395/500; 364/282.1; 364/282.4; 364/283.1; 364/254.7; 364/256.8; 364/974; 364/963.3; 364/DIG. 1
[58] Field of Search ............ 395/200, 600, 650, 700, 395/500

[56] References Cited

U.S. PATENT DOCUMENTS

| | | | |
|---|---|---|---|
| 5,095,522 | 6/1988 | Fujita et al. | 395/200 |
| 5,202,981 | 4/1993 | Shackelford | 395/600 |
| 5,206,951 | 4/1993 | Khoyi et al. | 395/650 |
| 5,212,787 | 5/1993 | Baker et al. | 395/600 |

OTHER PUBLICATIONS

Kim, W. "Object-Oriented Databases: Definition and Research Directions", IEEE Trans. Khow. ad Data. Engr. vol. Z. No. 3, Sep. 1990, pp. 327-341.
Fishman et al. "Iris: An Object-Oriented Database Management System" ACM Trans. Office Info. Sys. vol. 5 No. 1, Jan. 1987, pp. 48-69.

Primary Examiner—Thomas C. Lee
Assistant Examiner—Peter Y. Wang
Attorney, Agent, or Firm—Vincenzo D. Pitruzzella; Barry N. Young; Albert P. Cefalo

[57] ABSTRACT

The system for organizing communication among applications in a data processing network includes data bases and data base control means. The data bases include method entries, message entries, and class entries. Method entries refer to commands or other mechanisms used to invoke applications. Message entries each represent a type of operation which can be performed on instances in a class which correspond to that message and identify a method map which contains one or more references to method entries stored in the data base. Class entries, each of which is unique in a data base, contain information about classes consisting of instances which have common characteristics as well as identifying a corresponding group of message entries. The data base control means includes an invoker for identifying a method entry corresponding to the instance identifier and type of operation identified in a request for remote invocation of an application, and a dispatcher for transmitting the command identified in the method entry to the remote application. The system may include data bases in a data processing network comprised of one or more platforms or nodes and may be either global data bases accessible to the entire network or local data bases, each of which is accessible to only a part of the network.

4 Claims, 21 Drawing Sheets

FIG. 11D

| CLASS DATABASE OVERRIDE TABLE 1170 | |
|---|---|
| DATABASE NAME 1172 | LOCATION 1174 |
| DB_SCH_LST | Db1, Db2 |

FIG. 11C

| SERVER NODE TABLE 1150 | |
|---|---|
| PLATFORM TYPE 1152 | LOCATION 1154 |
| TYPE A | NODE a, NODE b |

FIG. 11B

| METHOD OVERRIDE TABLE 1110 | |
|---|---|
| METHOD SELECTOR ATTRIBUTE NAME 1115 | VALUE 1120 |
| PLATFORM | VAX.VMS |
| INTERACTION - TYPE | BUILT_IN |

MAIN CONTROL PROCEDURE

CONTROL SERVER

CONTROL SERVER

DISPATCHER PROCEDURE

DISPATCHER PROCEDURE

METHODS AND APPARATUS FOR IMPLEMENTING DATA BASES TO PROVIDE OBJECT-ORIENTED INVOCATION OF APPLICATIONS

RELATED APPLICATIONS

This application is related to U.S. Ser. No. 07/567,389, filed Aug. 14, 1990 entitled "METHODS AND APPARATUS FOR PROVIDING DYNAMIC INVOCATION OF APPLICATIONS IN A DISTRIBUTED HETEROGENEOUS ENVIRONMENT," now pending, U.S. Ser. No. 07/567,303, filed Aug. 14, 1990 entitled "METHODS AND APPARATUS FOR PROVIDING A CLIENT INTERFACE TO AN OBJECT-ORIENTED INVOCATION OF AN APPLICATION," now pending, and U.S. Ser. No. 07/567,131, filed Aug. 14, 1990 entitled "METHODS AND APPARATUS FOR IMPLEMENTING SERVER FUNCTIONS IN A DISTRIBUTED HETEROGENEOUS ENVIRONMENT," now pending, all filed the same day as this application

II. BACKGROUND OF THE INVENTION

This invention relates to the interaction of computer applications across a heterogeneous data processing network. Specifically, this invention relates to the organization of a data processing network in accordance with an object-oriented model and the interaction of independent applications across such a heterogeneous network environment.

Computers communicate with each other over data processing networks. The computers themselves are referred to generally as "nodes," and a specific type of computer, that is a specific type of hardware using a specific type of operating system, is referred to as a "platform." Networks containing different types of platforms are called "heterogeneous networks." One purpose for connecting platforms in a network is to provide different environments in which to execute application programs (referred to as "applications" for brevity) on shared data.

In the typical data processing network, different platforms and applications running on different platforms store information in their own specific manner. For example, in a VAX.VMS platform, text editing tasks may be accomplished using a TPU text editor, while in a MIPS ULTRIX platform, text editing tasks may be accomplished using an EMACS text editor. Users of a network having both platforms may wish to use operations from the different text editors on the different platforms without having to know the details of those platforms and text editors.

This compatibility has not previously been possible. Instead, conventional networks require users of a heterogeneous network to employ the specific interface each application requires for operations on specific platforms. Conventional networks fail to provide users with a capability to communicate between applications using a standard interface.

As an example of the difficulties of interapplication communication on a conventional heterogeneous network, suppose that the user of a text editor application on one platform desired to access a multi-user data base retrieval service, such as DIALOG for scientific articles or LEXIS for court opinions, on another platform. To do so on a conventional network, the text editor application's operation would have to be suspended, and the data base retrieval service would have to be invoked using commands and messages specific to the data base retrieval service. The user would not only need to know the specific names of each service desired, but would also have to know the location of the service in the network and would have to be familiar with the different commands and command formats employed by each service.

As yet no standard interface has been developed to allow an application in one platform to invoke an application on a different platform in a heterogeneous network in an efficient and uncomplicated manner. Instead, conventional interapplication communication merely provides mechanisms for physically transporting messages and data between applications.

One example of a mechanism which is presently used to allow an application on one platform to communicate with an application on a different platform is a Remote Procedure Call (RPC) system. An RPC system on one platform responds to queries from an "invoking" application by first translating that application's messages into a network data format, and then transmitting the translated queries over the network to a receiving platform. At the receiving platform, another component of the RPC system decodes translated messages into queries in a data format acceptable to the application invoked. The original messages from the invoking platform, however, need to be consistent with a syntax dictated by the invoked application.

Another difficulty with conventional networks occurs when the application on a remote node is not currently loaded and running. Many RPC systems only allow remote invocation of applications that are already loaded and running If this is not the case, the user of the client applications must find some way to load the server application on the remote platform before invoking it. This can be severely limiting.

One obstacle to implementing a network-wide system to facilitate interapplication communication has been the large amount of system resources which had been thought to be required of a system in order to handle all the different types of data, operations and applications in a network As a network expands, the systems, resources, and requirements would increase as well, making many proposed implementations completely unwieldy.

There is, therefore, a need for an efficient and simple manner for applications on different platforms to communicate with each other, such as through a uniform and consistent interface for applications. There is also a need for a dynamic invocation environment for applications in a distributed heterogeneous environment.

III. SUMMARY OF THE INVENTION

To achieve these needs, the present invention provides for interaction of processes in an object-oriented manner by which a system manages "classes" of data instances and applications rather than managing the data itself The management of such classes involves a data base which contains information about the classes, such as certain common attributes of applications or instances which are supported by the classes.

Client applications can remotely invoke other applications by sending globally (i.e., network-wide) recognized messages with parameters. Using the message names, as well as information about the classes of certain parameters, a reference to a specific method is selected from the data base. That method will perform the operation specified in the message. Other information in the data base is then used to locate and execute the actual code to implement the referenced method.

More particularly, in a memory resident in a data processing network which allows remote invocation of applications, a class data base for use in the data processing network comprises method entries each containing a reference to a corresponding invocation command to invoke one of the applications; message entries containing information for a plurality of messages, each of the messages specifying the types of operations which can be performed on instances in the corresponding ones of a plurality of classes, each of the message entries containing an identification of a corresponding group of the method entries; and a plurality of class entries each containing information for a different, uniquely-identifiable class, the classes identifying types of the instances, which are items that may be manipulated or accessed by the applications, according to shared characteristics, each of the class entries containing an identification of a corresponding group of the message entries.

A process of modifying the class data base for a new application, in accordance with this invention, operates in a data processing network having a class data base for use in allowing remote invocation of applications. The class data base is resident in memory in the data processing network and includes a plurality of class entries containing information for a plurality of uniquely identifiable classes, the classes identifying types of the instances, which are items that may be manipulated or accessed by the applications, according to shared characteristics. Each of the class entries contains an identification of a corresponding group of message entries, and the message entries contain information for a plurality of messages, each of the messages specifying the types of operations which can be performed on instances in the corresponding classes. Each of the message entries contains an identification of a corresponding group of method entries containing references to invocation commands to invoke the applications The application contains a plurality of messages, and the process comprises the steps, performed by the data processing network, of finding, for each of the messages for the new application, the corresponding class entry; adding to each corresponding class entry a message entry containing and identification of the corresponding message; and adding to each message entry identifications for method entries for the message corresponding to the message entry.

The accompanying drawings which are incorporated in and which constitute part of this specification, illustrate an implementation of the invention and, together with the description, explain the principles of the invention.

IV. BRIEF DESCRIPTION OF DRAWINGS

FIG. 11B is a diagram illustrating a preferred implementation of a method override table in the context object data base shown in FIG. 11A.

FIG. 11C is a diagram illustrating a preferred storage structure for a server node table in the context object data base shown in FIG. 11A.

FIG. 11D is a diagram illustrating a preferred implementation of a class data base override table in the context object data base shown in FIG. 11A.

V. DETAILED DESCRIPTION OF THE PREFERRED IMPLEMENTATION

Reference will now be made in detail to preferred implementations of the invention as illustrated in the accompanying drawings.

This invention is preferably implemented by data processors organized in a conventional network architecture. The architecture for and procedures to implement application interoperability, however, are not conventional, as they provide for an object-oriented approach to the interactions between applications in the network.

A. The Major Components of the Network

Figure 1:
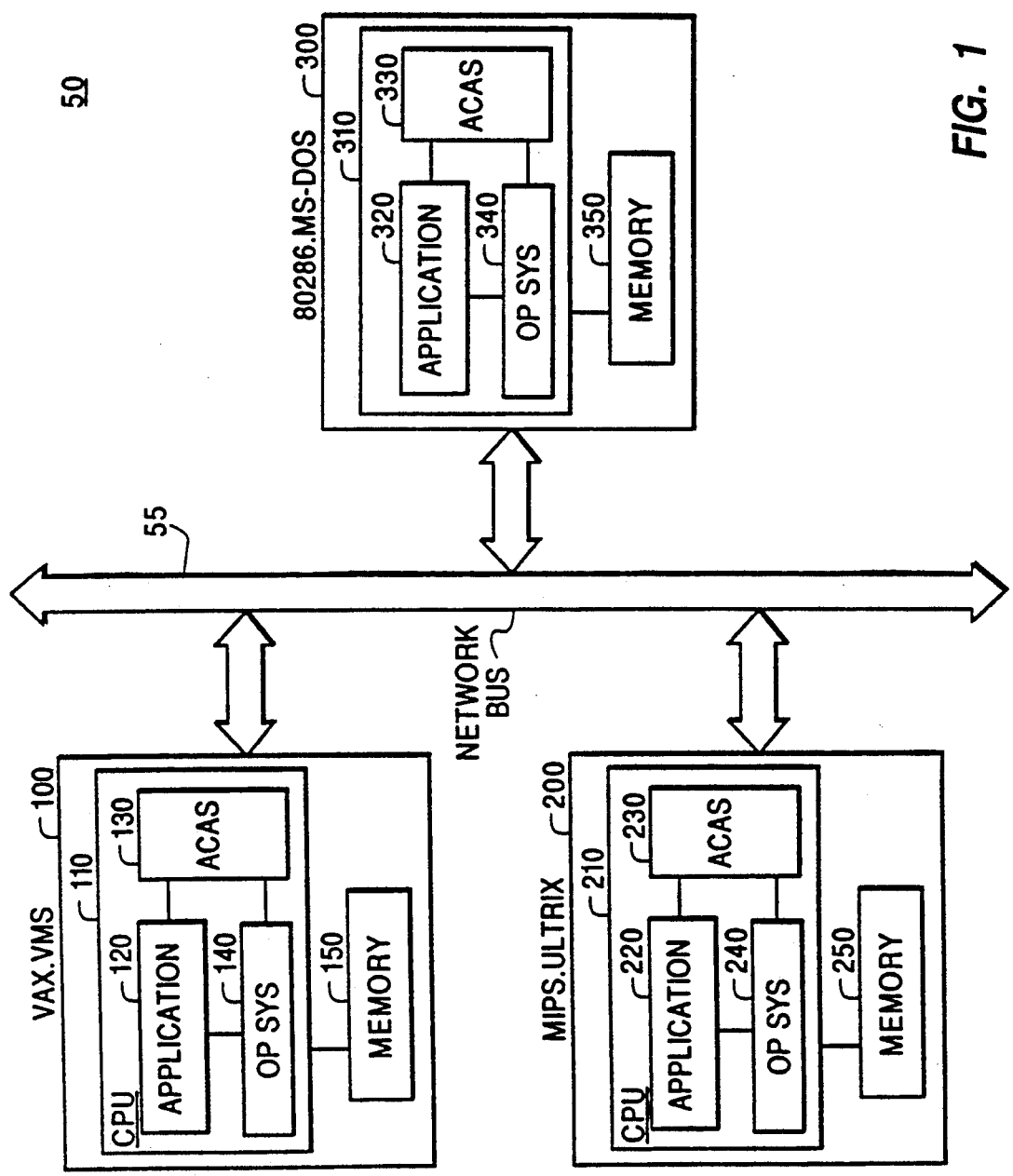
FIG. 1 is a diagram of a network which can be used in a preferred implementation of the present invention.

FIG. 1 illustrates a network 50 which can be used to implement the present invention. In FIG. 1, network 50 contains three independent platforms 100, 200, and 300 which are connected by a network bus 55. Although platforms 100, 200, and 300 are shown as completely heterogeneous (i.e., platform 100 is shown as a VAX processor using a VMS operating system, platform 200 is shown as a MIPS processor using an ULTRIX operating system, and platform 300 is shown as an 80286 processor using a MS-DOS operating system), this invention will operate in a homogeneous network as well. Also, the number of platforms is not important.

The composition and protocol of the network bus 55 is not important as long as it allows for communication of the information between platforms 100, 200, and 300. In addition, the specific network architecture is not crucial to this invention. For example, another network architecture that could be used in accordance with this invention would employ one platform as a network controller to which all the other platforms would be connected. It is believed, however, that the network 50 shown in FIG. 1 enhances the advantages of the present invention.

In the preferred implementation of network 50, platforms 100, 200, and 300 each include a central processing unit ("CPU") 110, 210, and 310 respectively, and a memory, 150, 250, 350, respectively.

Included within each central processing unit 110, 210, and 310, are applications 120, 220, and 320, respectively, operating systems ("OP SYS") 140, 240, and 340, respectively, and the Application Control Architecture Services ("ACAS") software components 130, 230, and 330, respectively.

Applications 120, 220, and 320 can be programs that are either previously written and modified to work with the present invention, or that are specially written to take advantage of the services offered by the present invention. For purposes of this description, applications either invoke operations to be performed in accordance with this invention, or respond to the invocation by other applications.

ACAS software components, 130, 230, and 330 implement the object-oriented approach of this invention. Preferably, ACAS software components 130, 230, and 330 consist of a number of software modules as described in greater detail below.

Operating systems 140, 240, and 340 are the standard operating systems which are tied to the corresponding CPUs 110, 210, and 310, respectively, of the platform 100, 200, and 300, respectively.

Memories 150, 250, and 350 serve several functions. One of the functions is, of course, to provide general storage for the associated platform. Another function is to store applications 120, 220, and 320, ACAS software components 130, 230, and 330, and operating systems 140, 240, and 340 prior to their execution by the respective CPU 110, 310, and 310.

In addition, portions of memories 150, 250, and 350 contain information for a network wide, or "global," data base which is shared and available directly or indirectly by all of the platforms 100, 200, and 300 in network 50 The global data base is described in greater detail below.

B. Elements of the Object-Oriented Architecture (1) Definitions of the Elements

Object-oriented methods have been used in programming to separate the interface of data from actual implementation, but such methods have not been applied to heterogeneous networks In the present invention, object-oriented techniques are used to separate the actual applications and their data from the implementation of operations on that data by other applications.

Figure 2:
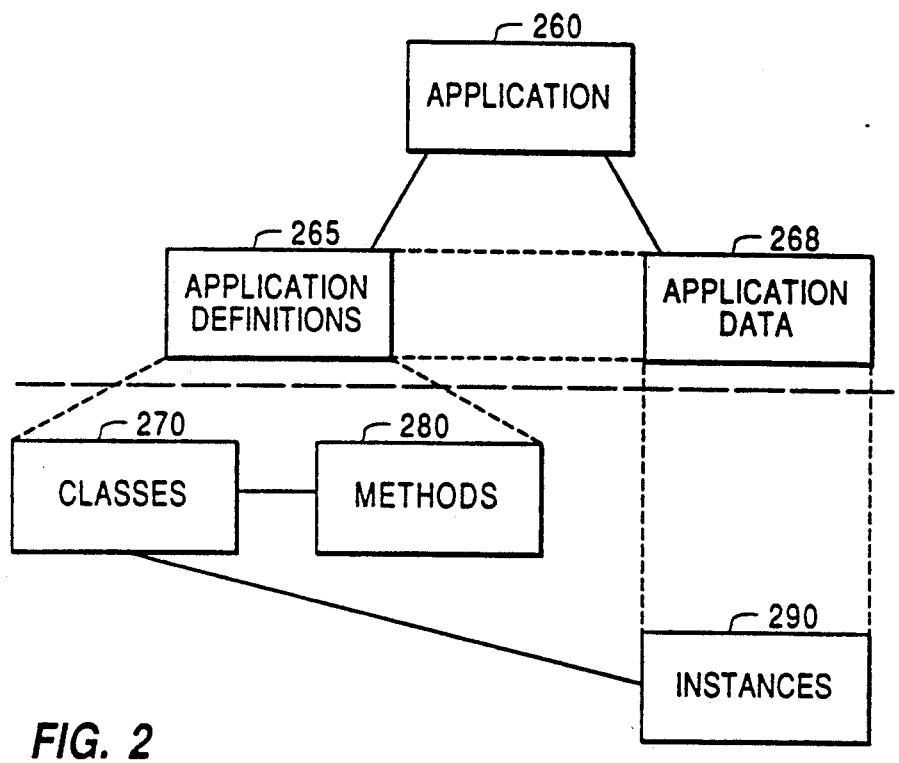
FIG. 2 is an illustration of the major components of an object-oriented model of this invention in relationship to an application.

The object-oriented architecture of this invention preferably includes certain key elements. FIG. 2 explains the relationship between certain of those elements and certain conventional features of applications. As shown in FIG. 2, an application 260 can be described in two ways. First, that application has certain application definitions 265. For example, if the application 260 is a word processing program, then the application definitions could include definitions of what operations that word processing program can perform and what kind of data that word processing system can operate upon.

In addition, application 260 includes application data 268 Application data 268 is the specific data upon which application 260 operates.

In accordance with the present invention, the application data is not "handled" by the object-oriented architecture. Instead, the present invention is organized around characterizing the application definitions and the application data in terms of object types, as referred to in the remainder of this description as objects. Objects are not shown in FIG. 2, but they pervade the elements that are shown.

In the discussion which follows, the term "object" will refer generally to several different kinds of elements, all of which have two characteristics in common. First, they refer to external capabilities, meaning that objects refer to or describe those portions of application definitions or application data which need to be communicated with other applications. Second, they are generic meaning that objects are intended to be available to all applications, and as such have a universally recognized and unique name for all applications that have interfaces to the objects The present invention involves the handling of objects rather than the handling of specific data or applications.

As shown in FIG. 2, two elements of the object-oriented architecture of this invention are developed from the application definitions 265. One is classes 270 and the other is methods 280. Classes are objects in the sense that the names. Of the classes and the features of the classes are both external and generic. Furthermore, classes can be used as means for describing not only applications, but also the data used by the applications.

In addition, one can derive certain types of operations from the application definitions 265 that are performed by that application, and these are specific examples of methods 280. Again, however, the specific methods 280 are not managed by the system, but rather can be organized into classes. The classes for those methods (called method objects) are generic and external, even though the specific commands or operations executed by the applications are not.

Instances 290, which are derived from the application data 268, are items that may be manipulated or accessed by an application. Again, the instances are not objects managed by this architecture. Instead, instances are organized into classes such that instances in the same classes share common characteristics. For example, a specific DECwrite application, which is a compound document editor, may be operating on a specific file called MYFILE. This is a specific file, and it is not handled by the ACAS system. Instead, MYFILE may belong to a class of compatible files, such as ASCII-_FILE, which is generic and therefore a class object.

By the same token, a specific DECwrite application is not managed by the entire system. Instead, however, the specific DECwrite application may belong to a class called DECwrite which is generic and a class object.

As can be seen from FIG. 2, applications can then be characterized by the classes to which the applications belong, by the classes (method objects) which support the specific methods in that application, and by the class objects upon which the method objects can operate.

One of the features of classes is that they may be hierarchically organized. This is explained in greater detail below, but may be understood preliminarily by considering the concept of superclasses and subclasses. A superclass is a parent of its subclasses, and each subclass is a child of at least one superclass. The superclass/subclass relationship means that the attributes or shared characteristics of the superclass are inherited by the subclass. For example, a class of DATA_FILES may have as attributes the capability of being opened, read, and written. Two subclasses of the class DATA_FILES could be of SEQUENTIAL_FILES and RANDOM_ACCESS_FILES In addition to the attributes of being able to be opened, read, and written, the subclass SEQUENTIAL_FILES could also have the attribute of being accessible sequentially, and the subclass RANDOM_ACCESS_FILES could have the attribute of being accessible directly by an address.

Another element of the object-oriented architecture of this invention not reflected in FIG. 2 is messages. Messages are the interfaces between an application program and the methods, and are used in the application program to specify types of operations which can be performed on the instances identified in the client application. The messages are generally in the form of a selector of an operation, such as PRINT, and several parameters, which can be instances, strings, numbers, etc The relationship between these elements is described in the next section.

(2) Relationship of Elements

Figure 3:
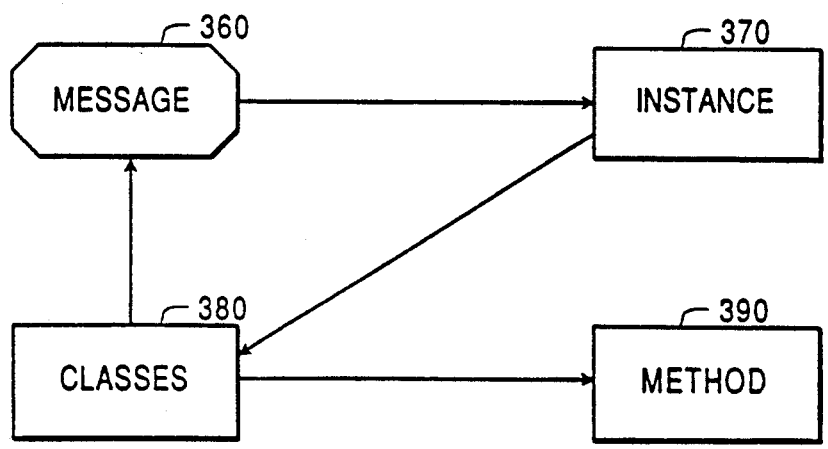
FIG. 3 is an illustration of the relationships between the components of the object-oriented model of this implementation of the present invention.

FIG. 3 is a diagram showing the relationship of the different elements previously described. As FIG. 3 demonstrates, each instance 370 is associated with a class 380. Another way of understanding this is to consider class 380 as a "template" for the creation of objects in that class, which can be instances, as well as for the manipulation of such objects The term "template" denotes the fact that the objects (be they data items, methods, or applications) in each class, share certain characteristics or attributes determined by that class.

An instance 370 is manipulated by sending a message 360. The message 360 might be an action, such as EDIT, READ or PRINT. Messages are said to be "supported" by the class, which means that the interpretation of the message depends upon the classes to which the instances in that message belong. For example, a PRINT message may be interpreted differently if the instance is a text file in the class TEXT_FILE, as opposed to a color graphics file in a class COLOR_GRAPHICS.

A message 360 does not describe the implementation of a particular operation; it only represents the interface to the implementation of a particular operation. Thus, to find the particular operation that is called for by a particular message 360 (i.e., the method), one must not only examine the message, but also the class of the instance. To cause a specific action to occur, the message 360 must be mapped to actual executable program code. This mapping occurs by finding the particular message 360 which corresponds to the particular class 380 of the particular instance 370 and then finding the particular method 390 which corresponds to the message 360 supported by the class 380. The method 390 represents the actual executable program code to implement the desired operation of the message 360 on the instance 370.

(3) Organization

Figure 4A:
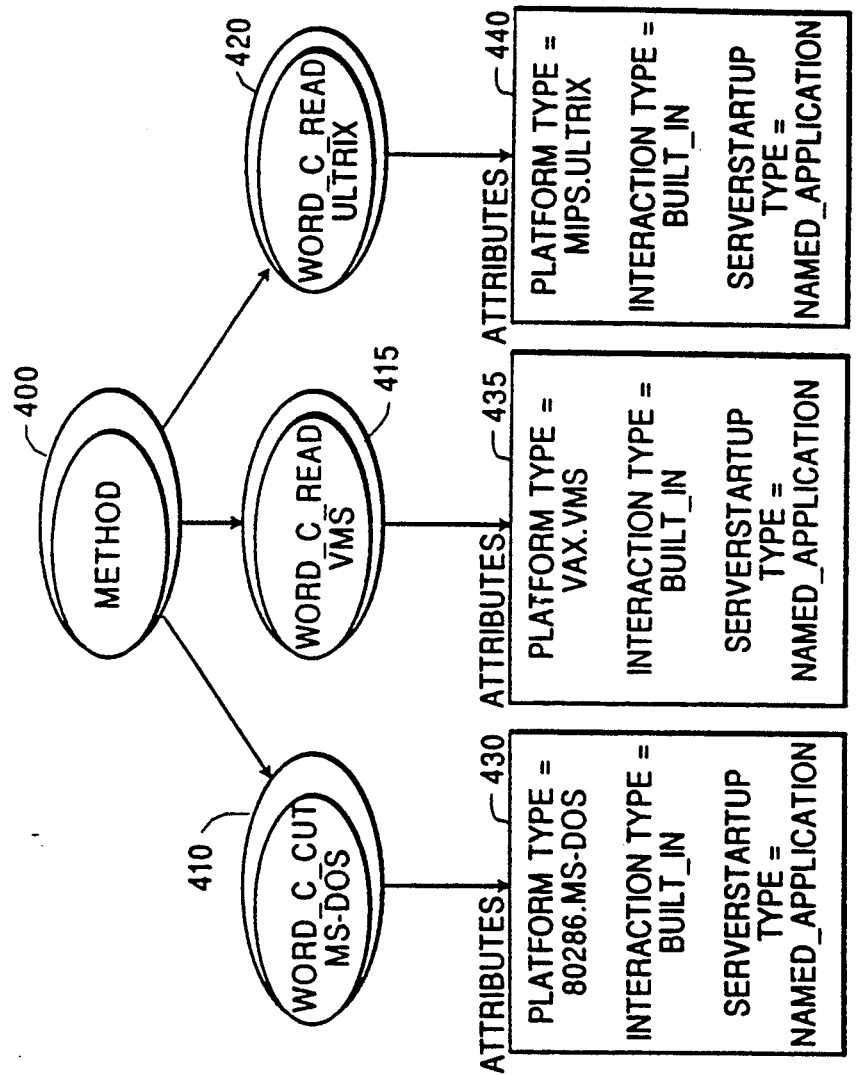
FIG. 4 is an illustration of the relationships between examples of the components of the object-oriented model of this invention.
Figure 4B:
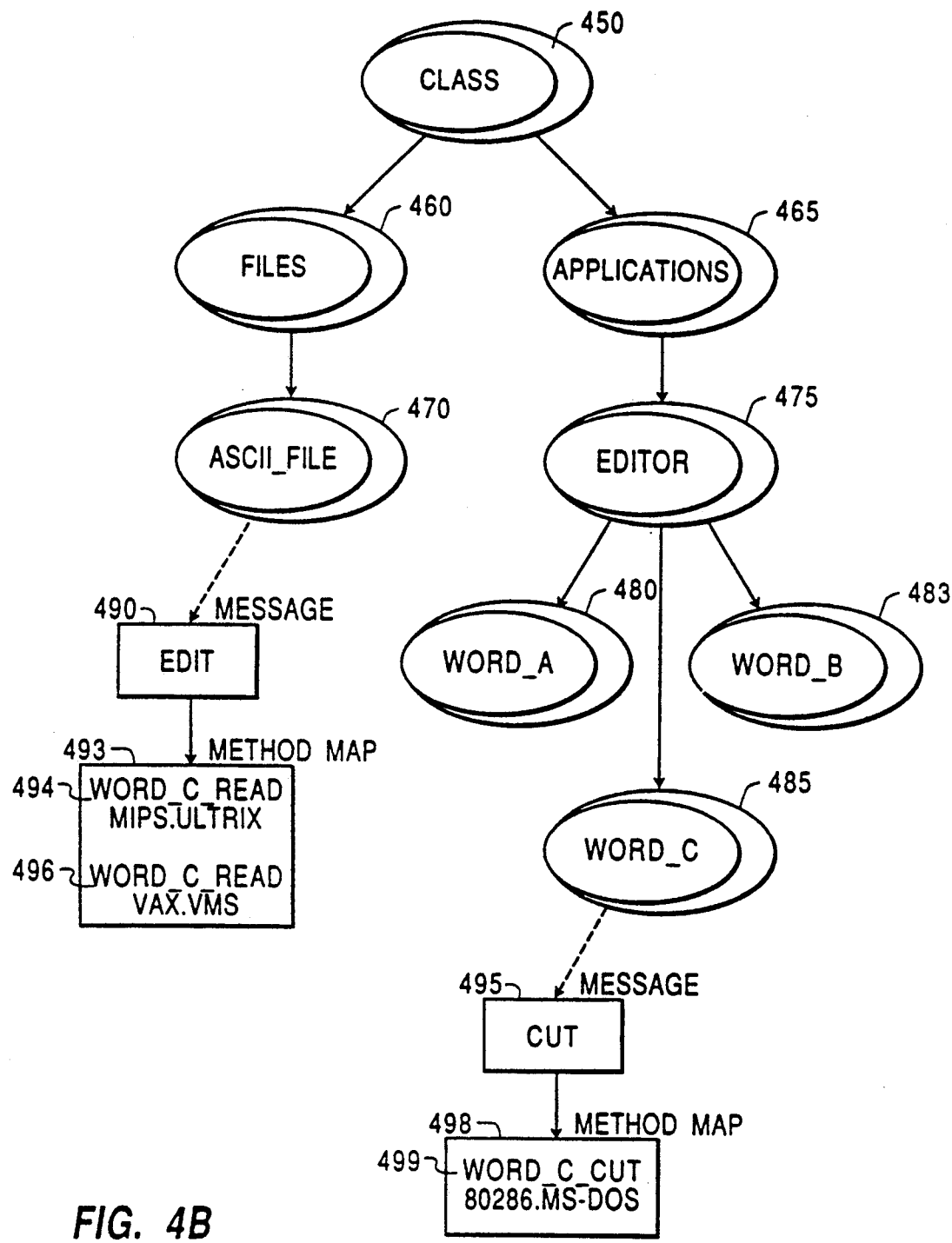

FIG. 4 shows a representation of how the different object-oriented architecture elements can be organized preparatory to their specific representation in memory. As is apparent from FIG. 4, there is a complex relationship involved between the classes and the methods. A hierarchy is used for both methods and classes in the preferred implementation to effect the object-oriented approach necessary to reflect the behavioral relationships which must exist among the applications. The specific examples given, however, are merely illustrative, and other types of representations for these classes and methods may be apparent to those skilled in the art.

In the diagrammatic representation shown in FIG. 4, there are essentially two branches of the hierarchy. One is headed by method object 400 and the other by class 450. The branches, hierarchies differ by what is inherited. In the class hierarchy, the inheritance is of behavior because such inheritance includes messages. In the method hierarchy the inheritance is only of attributes. The bridge between the class hierarchy and the method hierarchy is by way of the messages, such as messages 490 and 495, and the method maps, such as maps 493 and 498. In the method hierarchy shown in FIG. 4, method objects, 410, 415, and which are represented as WORD_C_CUT_MS-DOS, WORD_C_READ_VMS, and WORD_C_READ_ULTRIX, respectively, inherit from method object 400. For example, in FIG. 4, method object 400 may have attributes (not shown) that indicate that the methods use a certain interaction type and have a certain server start-up type.

Method object 410 is representative of the CUT function in EMACS applications. Associated with method 410 is a set of attributes 430 which includes those inherited from method object 400. Briefly, the PlatformType attribute indicates the platform on which the method object can be executed. The InteractionType attribute describes the actual type of method which will be executed within a particular method server Examples of values for this attribute which are explained below, are: BUILT_IN, SCRIPT_SERVER and DYNAMIC_LOAD The ServerStartupType attribute indicates an appropriate invocation mechanism to be used for the method server. Examples of values for this attribute, which are also explained below, are: SHELL, DYNAMIC_LOAD and NAMED_APPLICATION.

The set of attributes 430 specify that the associated methods operate on platforms which have an 80286 processor with the MS-DOS operating system, and have a BUILT_IN, interaction type, and a NAMED_APPLICATION server start-up type.

Similarly, method object 415, which is representative of the READ function in EMACS applications. Associated with method 415 is a set of attributes 435 which include those inherited from method object 400, but which also specify that the associated methods operate on VAX platforms running the VMS operating system, and have an interaction type of BUILT_IN, and a NAMED_APPLICATION server start-up type.

Method object 420 is a subclass of method object 400 representative of the READ function in EMACS applications. The attributes 440 for method class 420 have a platform type with a MIPS processor running the ULTRIX operating system with a BUILT_IN interaction type, and a NAMED_APPLICATION server start-up type.

Class 450, on the other hand, is a superclass of class 460 called FILES, and a class 465 called APPLICATIONS. Class 460 refers to data objects. As shown in FIG. 4, class 460, which would have attributes (not shown), is a superclass of class 470. Class 470 is called ASCII_FILE. For example, class 470 could represent all the files within network 50 (see FIG. 1) having the common characteristics of ASCII_files. The common characteristics can be described in the attributes for class 470, which are not shown in FIG. 4.

The class 470 would then be the class for several instances, but the instances are not shown in FIG. 4 because they are not managed by the object-oriented architecture. What is shown in FIG. 4 are the messages which the class 470 will support, and the only one shown for purposes of simplicity is the EDIT message 490.

A class supporting a message means that when the message is used as an interface into this object-oriented architecture, it can be used with the class that supports it, and therefore instances within that class Thus, in the example shown in FIG. 4, an EDIT message can be sent to all instances in the ASCII_FILE class.

APPLICATIONS class 465 is also a superclass, and one of its subclasses, EDITOR class 475, is shown. EDITOR class 475 is a superclass to specific applications classes 480, 483 and 485, corresponding to WORD_A, WORD_B, or WORD_C. Each of the classes, such as WORD_C_485, represents a specific application, such as EMACS or TPU. Thus, each application is defined by one class. An application class may, however, refer to the implementation behavior of more than one application.

The application classes also support messages, which is shown by the message CUT 495 being supported by the application class 485. This reflects the fact that at the time of class definition, it was determined that any application represented by the class 485 would have to support a message CUT.

As mentioned briefly above, in the preferred implementation, applications are organized into a hierarchy of classes with a parent class, referred to as a superclass, and child classes referred to as subclasses. In FIG. 4, class 465 is a superclass called EDITOR. All subclasses of this superclass would have at least the same set of particular unique characteristics or attributes of the superclass. In FIG. 4, the subclasses of super class 475 EDITOR are WORD_A 480, WORD_B 483, and WORD_C 485. WORD_A might represent TPU applications, WORD_B 483 might represent all LSE applications, and WORD_C_485 might represent all EMACS applications. Each of these subclasses would have, in addition to the characteristics and attributes inherited from superclass 475, their own set of unique characteristics and attributes which differ in such a manner as to enable their separation as subclasses within the superclass 475 EDITOR.

In the preferred implementation of this invention, specific rules of inheritance allow for multiple inheritance among classes. This means that any subclass may have more than one superclass. Because this type of inheritance may create ambiguities at definition time, the superclasses are considered to be "ordered" at definition time to resolve potential inheritance conflicts. For instance, at the time of the definition of a subclass described below, if any conflicts arise due to the duplicate definition of a message or attribute in more than one of the listed superclasses, the message or attribute defined in the highest ordered class is considered to be the one inherited by the subclass.

As mentioned above, the relationship between the method objects and the class is by way of method maps. FIG. 4 shows two method maps 493 and 498. Each of the classes has messages each of which refers to a specific method map. Thus, method map 493 is associated with EDIT message 490, and method map 498 is associated with the CUT message 495.

Preferably, the method maps include the name of a method object associated with the messages. Method maps could also contain the name of another class and message. Thus, method map 493 includes the name of two method objects. Method map 493 includes the name of a method object WORD_C_READ MIPS-.ULTRIX 494, which is a name for method object 420, and the name of a method object WORD_C_READ VMS 496, which is a name of method object 415.

In a similar manner, the method map 498 for the message CUT 495 contains the name WORD_C_CUT 80286.MS-DOS 499, which is the name of the method object 410.

In this way, the method maps 493 and 498 can be used to locate the attribute sets 430, 435, and 440 corresponding to the method objects 410, 415, and 420, respectively. The specific manner in which this type of order is used to locate methods is described in greater detail below.

C. Class Data Base Structure

Figure 5:
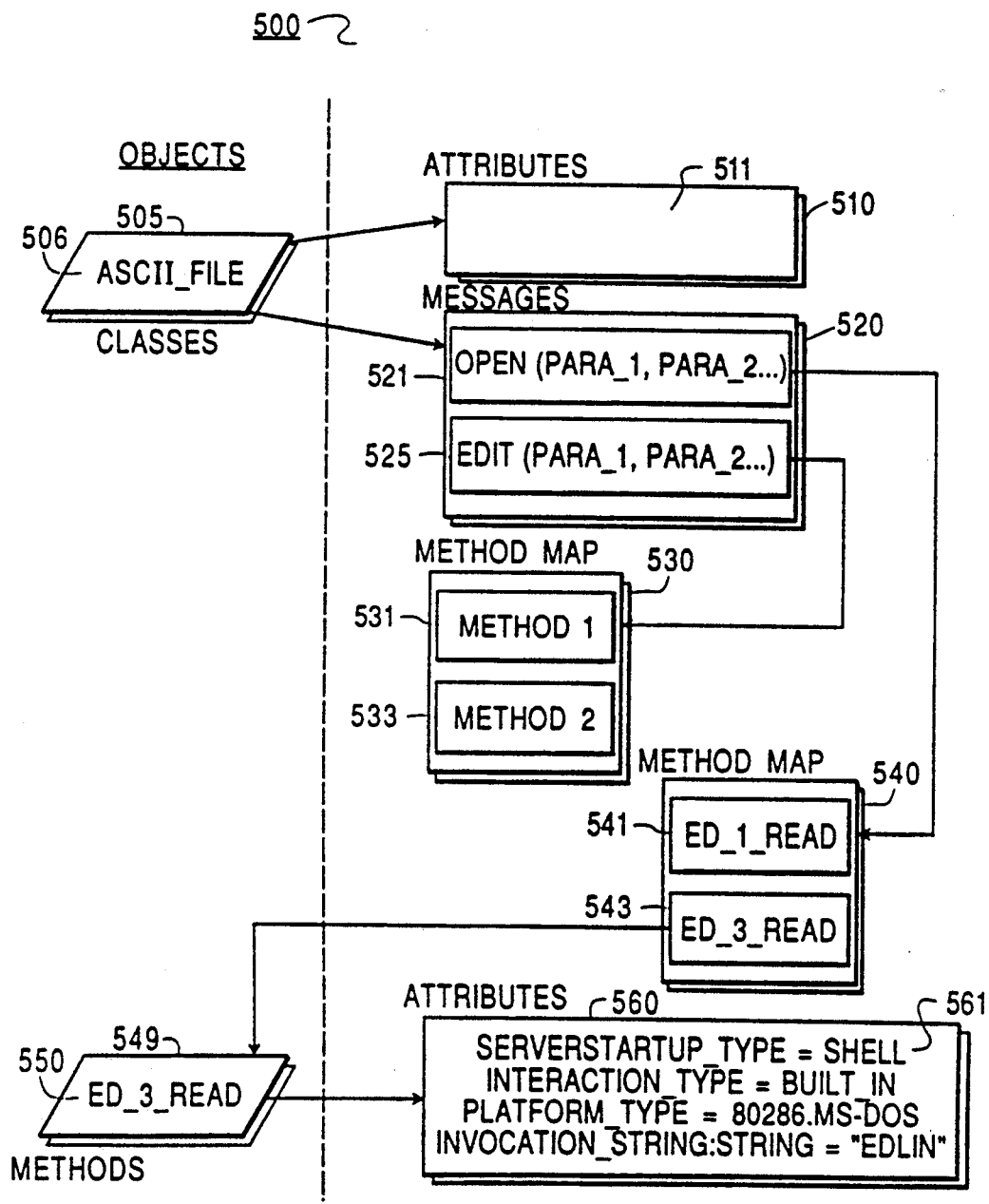
FIG. 5 is an illustration of a structure for a class data base according to the preferred implementation and consistent with the relationships illustrated in FIG. 4.

The classes and method objects of the network architecture are stored in a class data base 500 depicted in FIG. 5. The class data base 500 represents a nonredundant collection of interrelated data items that can be shared and used by the network 50.

In FIG. 4, the class data base 500 consists of two types of objects, similar to what is shown in FIG. 4. The objects are either classes 505 or methods 549. Each of the classes 505 corresponds to a generic external representation for the instances of the corresponding class. For example, in FIG. 5, the class object ASCII_FILE 506 corresponds to a generic external representation for all members of the set of instances that have the characteristics of the class ASCII_FILE 506. The characteristics are represented by the corresponding set of attributes 510.

In the preferred implementation, the attributes 510 which correspond to the classes 505 may be used in whatever manner the system developer or user wishes. For example, the attributes 511 for the class ASCII__FILE 506 may include the name of an icon to represent class 506 on display.

Each of the classes 505 also supports a set of messages 520. A message consists of a "verb" or message name, such as CUT, READ or EDIT, called a selector, and parameters. Each of the parameters consists of a name and a type and a direction. The name is "typed" which means that the name is of a particular type, e.g., integer, character or string. The possible directions for each parameter may be "in," "out," and "in/out." When a parameter in a message has an "in" direction, this means that the parameter is an input to a method to be invoked (discussed below). When a parameter in a message has an "out" direction, this means that the parameter is an output from a method. When a parameter in a message has an "in/out" direction, it means that the parameter is both an input to and output from a method.

The messages 520 are representations for the valid operations that each of the instances represented by the corresponding class 500 can support. For example, in FIG. 5, class object ASCII_FILE 506 supports the set of messages 520 which includes messages 521 and 525. The specific messages in message set 520 are OPEN (PARA_1, PARA_2 . . . ) 521 and EDIT (PARA_1, PARA_2 . . . ) 525. For example, in the message EDIT (PARA_1), PARA_1 might represent "FileName: string, in/out," where FileName is the name of the parameter, string is the parameter type, and in/out is the direction of the parameter.

Messages 521 and 525 each refers to respective method map 530 and 540. Each of the method maps 530 and 540 contains a set of references to corresponding method objects 549 in the class data base 500 or to the names of other classes and messages. For example, method map 530 contains references 531 and 533 each of which corresponds to a different method object (not shown). Method map 540 also contains references 541 and 543, each of which corresponds to a different one of the method objects 549 in the class data base 500. The corresponding method object for the reference 541 is not shown in FIG. 5. For purposes of this example, FIG. 5 does show that the reference 543 on method map 540 refers to the method object 550 which is ED_3_READ.

As explained above, the method objects 549 in the class data base 500 are also stored hierarchically. Each of the method objects 549 is representative of a reference to executable code capable of performing a method.

In a network data processing system like the preferred implementation, there may be many instances of the executable code associated with each of the method objects 549 and capable of performing the functions identified by each method object. By way of example, in each the memories 150, 250 and 350 (FIG. 1) there may be an installation of the executable code associated with the method object ED_3 READ 550, with each of the executable codes being capable of performing the functions of the method object ED_3 READ 550 on a respective one of the platforms 100, 200, and 300. The system according to the preferred implementation includes a process which selects between the three executable codes.

Unlike the attributes 510 associated with the classes, the method attributes 560 of the class data base 500 associated with method objects 549 are used to locate and to execute an instance associated with a particular method object, such as method object 550, in the network. For purposes of simplicity, FIG. 5 shows only one set of method attributes 561 in the class data base 500. The set 561 is associated with the method object 550 of the method objects 549 in the class data base 500. Although some of the method attributes in sets 560, can be arbitrarily specified by the users of the system and used by the system during execution, certain attributes are critical to the operation.

As shown in FIG. 5, the method attributes in set 561 includes PlatformType=80286.MS-DOS, InteractionType=BUILT_IN, and ServerStartupType=SHELL.

In the preferred implementation, two other method attributes are included in the method attribute set 561. One is an InvocationString attribute which defines an invocation string to be used in order to start the specified method server if it needs to be started. The value of this attribute must be a value appropriate for the particular platform specified in the first attribute. For example, if the value of the PlatformType attribute is MIPS-.ULTRIX and the value of the ServerStartupType attribute is SHELL, then the value of this attribute should be an appropriate ULTRIX shell command.

D. Information Flow

Before discussing the details of the preferred implementation of this invention, the flow of information throughout the entire system will be explained with reference to FIG. 6.

Figure 6:
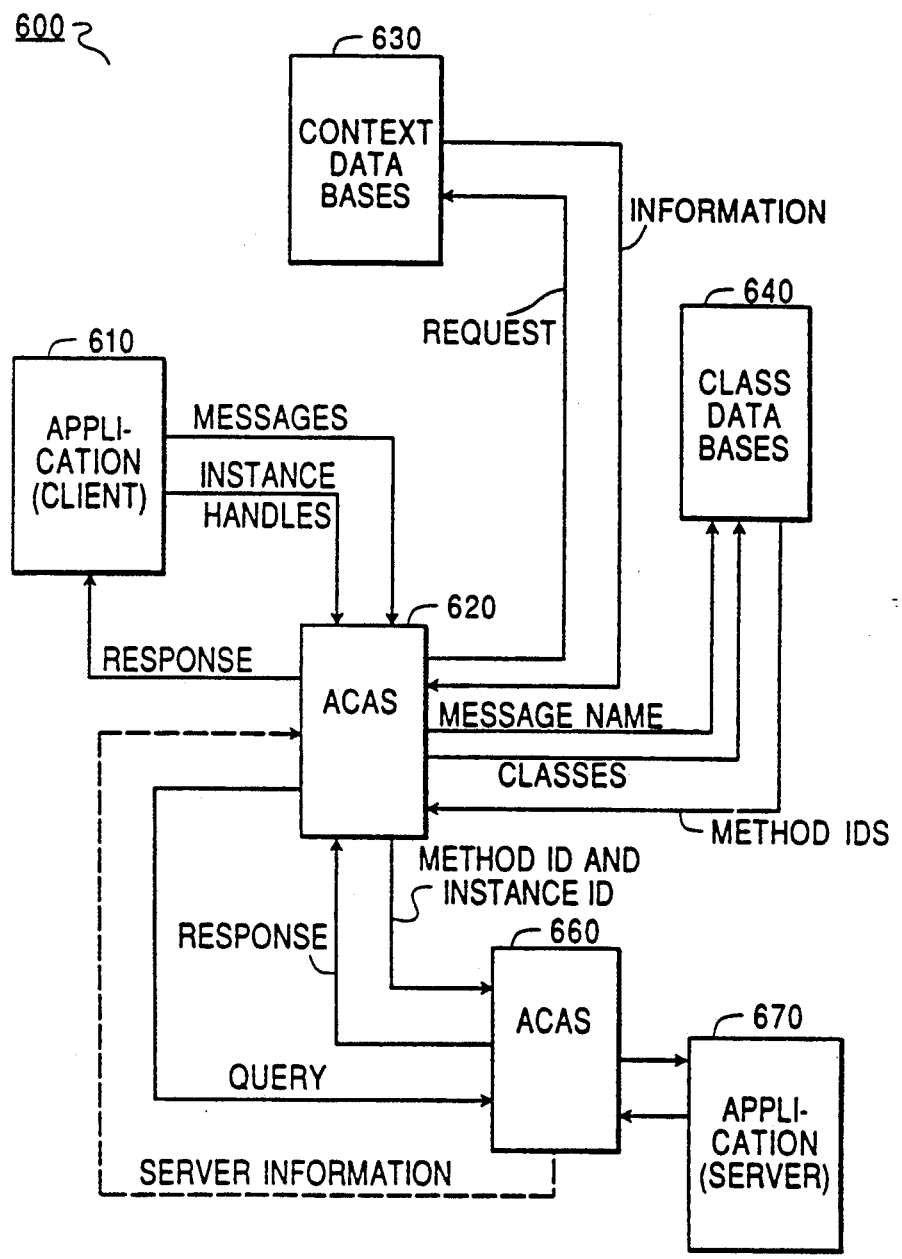
FIG. 6 is a diagram of the different components of the preferred implementation, and of the preferred flow of information between these components.

FIG. 6 includes a diagram 600 showing different components of the network 50 shown in FIG. 1 and the information flowing between those components. Applications 610 and 670 in FIG. 6 each correspond to any one of the applications 120, 220, or 320, respectively, and the ACAS software components 620 and 660 each correspond to anyone of the ACAS software components 130, 230, or 330. The class data bases 640 and the context object data bases 630 are stored in one or more of the memories 150, 250, and 350.

As explained in greater detail below, an application 610, which will be referred to as a "client application," sends messages. The messages may include instance handles which are the mechanisms used to identify the client (or any other) application's instances. The messages are received by the ACAS software component 620 in the client platform.

ACAS software component 620 then uses the names of the messages and the classes of the instances referred to by the instance handles to find the method maps in class data bases 640. ACAS software component 620 may also use context information from context object data bases 630 to select a method identifier from the method map which identifier represents the method to be executed. The context information is also used to select a platform, called the "server platform," on which to execute the selected method. The context information will be described in detail below.

ACAS software component 620 sends the method identifier retrieved from the class data base 640 and the instance handles to an ACAS software component 660 in the server platform. Thereafter, the ACAS software component 660 takes the appropriate steps to execute the identified method using a "server application" 670 or informs the ACAS software component 620 that the server platform containing ACAS software component 660 cannot respond to the request. In this latter case, the ACAS software component 620 then reviews the context information to select another platform in the network as a server platform or else informs the client that the request has failed.

If the execution of the method identified in FIG. 6 by the server application 670 generates a message to be returned to the client application 610, then that message along with additional information is passed from server application 670 to ACAS software component 660 in the server platform. ACAS software component 660 in the server platform then sends responses to ACAS software component 620 in the client platform, which relays those responses to the client application 610 in the client platform.

All these transactions will be described in greater detail below.

E. Memory Systems (1) Global Class Data Base

Figure 7:
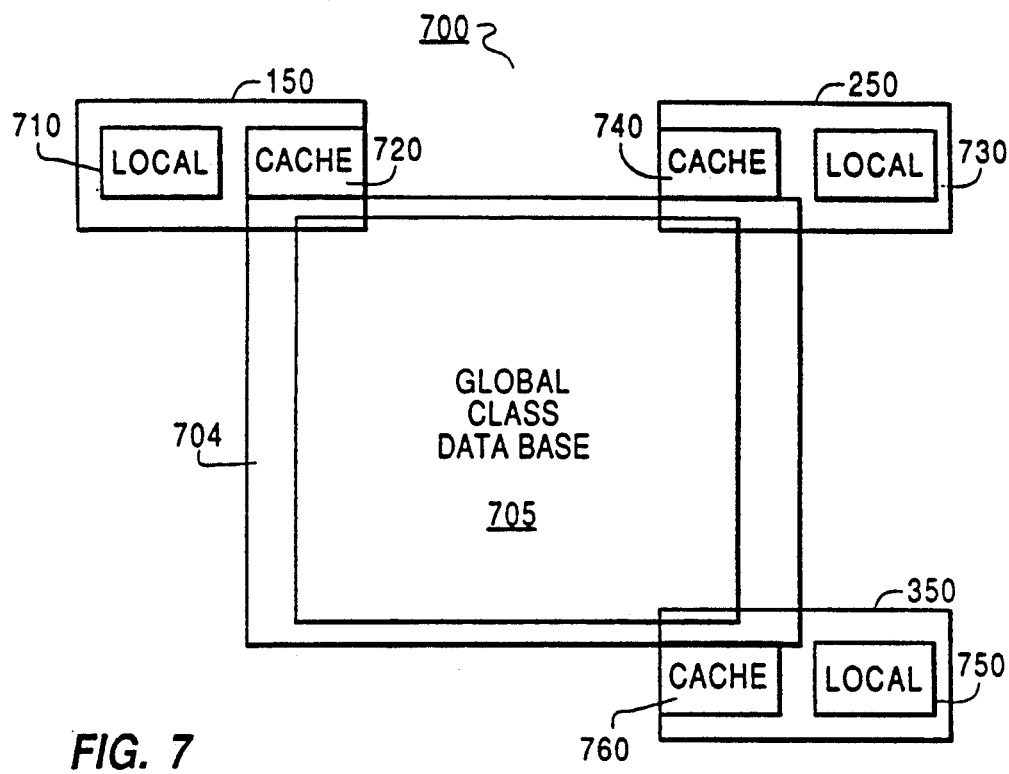
FIG. 7 is a diagram showing the relationships of the different memory systems in the preferred implementation.

A diagram of the entire memory system 700 is shown in FIG. 7. Memory system 700 includes a global class data base 705 and local class data bases 710, 730 and 750. A network-wide memory 705 is also provided to make certain other information, described below, available to users of the network.

Global class data base 705 contains information accessible by all of the platforms. Preferably, global class data base 705 is distributed throughout the memories of the platforms. For example, in FIG. 7, global class data base 705 is shown as being partially resident in each of memories 150, 250, and 350. The remainder of the global class data base 705 would be resident in other memories which are not shown in FIG. 7. The contents of the global class data base 705 have already been described with regard to FIGS. 4 and 5.

Persons of ordinary skill in the art will recognize that the distributed memory arrangement shown in FIG. 7 is not required to practice the present invention. For example, the entire global class data base 705 could be stored in the memory of a single node or in a dedicated memory, without affecting the principles of this invention.

In addition, each of the memories 150, 250, and 350, is shown as having a local class data base 710, 730, and 750 as well as a node cache 720, 740, and 760, respectively. The information in the local class data bases is accessible only by users on the corresponding platform. Node caches 720, 740, and 760 are used to hold a copy of portions of global class data base 705 which are accessed frequently by the corresponding platform.

The data base system used to implement the global class data base structure should support global uniqueness of names within a single data base, uniqueness of identifiers across data bases, access control mechanisms, and proper storage and retrieval mechanisms. Global name uniqueness is important for objects because they are generic. Identifier uniqueness allows data bases to be combined, as explained below.

Access control mechanisms of the data base system must allow an authorized user on any platform in the network to store and retrieve objects and attributes, and must provide security control and syntax checking to avoid compromising the integrity of global class data base 705. Some of the details of this control are discussed below. The remainder involve well-known data base management techniques.

The preferred implementation requires that each object in global class data base 705 can be assigned an object identifier which, like an object name, can be used to refer to an object. Object identifiers are also preferably language neutral because they are binary codes.

Object identifiers are assigned based upon a "globally" agreed-upon scheme, and are unique throughout any number of class data bases. Object names, on the other hand, need be unique only within a single class data base. The differences between the class names and identifiers can be better appreciated by an example. Assuming two companies each have their own class data base and wish to merge those data bases. Those data bases may have classes with the same names which should be different in the merged data base, and that difference can be maintained through the globally-unique identifiers. The data bases may also have two classes with different names which should be the same in the merged data base. Those classes can be set to have the same class identifier. Thus, the object identifiers also permit the same class in the global class data base to be identified by more than one class name. For example, the class name EDITORS in the global class data base in the network may also be identified by the class name WPROCESSORS.

Another software component which is also included in each of the ACAS software components 130, 230, and 330, provides the mechanism to create a unique object identifier for use and storage in the class data bases. Preferably, any storage scheme employed by an application which requires the persistent storage of object names should store the object identifiers rather than the object names to avoid naming conflicts between multiple global class data bases.

The global class data base 705 is not meant to store application instance data because preferably applications completely manage their own sets of application instance data. This allows existing applications to continue their current storage strategies, and does not restrict the storage options The preferred implementation provides two mechanisms, however, storage classes and instance naming, which enable applications to link their privately managed instances with the global class data base 705 maintained by the preferred implementation.

Storage classes are an abstraction that allow an application to specify how privately managed instances are to be interpreted. The storage classes give an alternative to identifying the class of each instance when the instance is used in a message. In the preferred implementation, storage classes identify storage systems, such as repositories or files, which contain names of instances. For example, a storage class can describe a known storage mechanism such as "RMS_FILE" or "UNIX_FILE."

In the object-oriented architecture of this invention, storage classes are also considered to be classes. Similar to other classes stored in the class data base, the storage class can be viewed as an actual object-oriented class definition that consists of attributes, messages, and methods. The methods associated with each storage class are used to retrieve the class name for an instance associated with the particular storage system identified by the instance's storage class.

The other mechanism, instance naming, employs a standard for the naming of instances in the preferred implementation. The standard instance handle is a string represented by the following logical structure:

<class> <storage_class> <location> <instance_reference_data>

The term "class" is the name of the associated ACAS class. The term "storage_class" is an alternative to the class name and is the name of the storage class. The term "location" is the logical location, such as the node, of the instance. The "location" is optional and will be used if a client desires a method to run at the same location as the instance is located. The term "instance_reference_data" is the application private portion of the instance handle.

Instance handles allow implementations to refer to instances abstractly, thereby avoiding the need to manage the instances themselves.

The instance handle preferably includes the class or storage class (if necessary), location of the instance, and the identifier for the instance. For example, in the message:

EDIT (INSTANCE_HANDLE)

EDIT represents the desired operation. The INSTANCE_HANDLE string could be ASCII_FILE/-NODE_1/MYFILE.TXT. In this instance handle, ASCII_FILE represents the class, NODE_1 is the location of the instance, and MYFILE.TXT is the identifier of the instance. This message provides sufficient class and message information to find the proper method map. It will be apparent to those of ordinary skill in the art that other formats may be employed for the INSTANCE_HANDLE string to accomplish the same objectives as the preferred implementation does.

As explained above, all classes in a global class data base of the preferred implementation have unique names with the particular global class data base. The class name is generally assigned by the user who first defines the class.

(2) Local Class Data Bases

In addition to a global class data base, the preferred implementation also supports local class data bases for class and method definitions. The local class data bases function similar to the global class data base, except the contents of the local class data bases are not globally available. They need only be available for their local node. Thus, the local class data bases need not be distributed or replicated in other nodes.

FIG. 7 shows a preferred implementation of the local class data bases 710, 730, and 750 in memories 150, 250 and 350, respectively. The local class data bases 710, 730 and 750 hold the class and method information created by the corresponding nodes which has not yet been added to the global class data base.

In the preferred embodiment, memories 150, 250 and 350 also contain node caches 720, 740 and 760, respectively, which hold method and class information loaded from global class data base 705. Caches are an optimization and are not strictly required.

The data base system used to implement the local class data base must provide name uniqueness within a single data base. Access control for the local class data base is only required at the data base level. The preferred implementation of a local class data base relies upon the underlying security mechanisms within the data base system to control access to the contents of the local class data base.

Use of the local class data base provides several advantages over use of the global class data base. For example, the local class data base provides the ability for applications on each node to continue to communicate with each other in an object-oriented manner even when the network is unavailable. In such a situation, applications on the node can continue to invoke other applications that are local to that node.

In addition, using a local class data base provides better performance for applications that reside in the same node as the local class data base because many invocations can be handled completely within the confines of a single platform. On platforms in which most applications will most likely use invocations that can be handled locally, use of the local class data base may eliminate or greatly reduce the need for network activity, such as accessing the global class data base, to accomplish an invocation.

The class data bases are preferably searched for class and method information by searching the local data bases before searching the global data base. The local data bases of each node are preferably searched in a predetermined order as explained below. As soon as the desired information is located, the search stops. Only if the desired information cannot be located in a local data base is the global data base searched. Thus the search order defines the "priority" of the class data bases.

Figure 8:
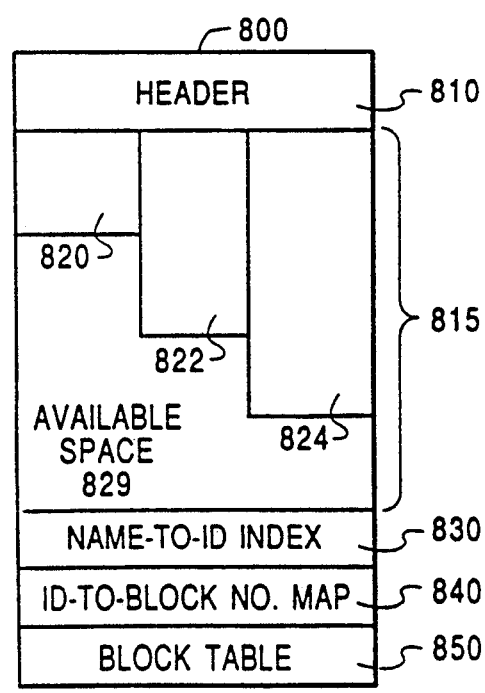
FIG. 8 is a diagram of a preferred structure of a local class data base.

FIG. 8 shows one design of a portion of a local class data base 800. This design, however, is not critical to the invention. Preferably local class data base 800 contains a data base header 810 which is used to locate other organizational information in the local class data base 800 such as indices and allocation maps. Local class data base 800 also includes a block storage space 815 containing a number of blocks 820, 822, and 824 which hold the information about the classes and methods.

Figure 9:
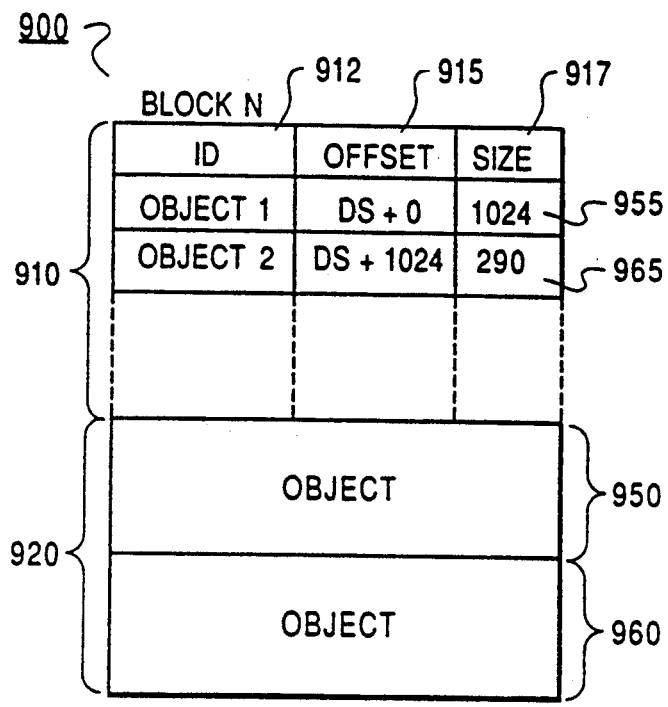
FIG. 9 is a diagram of a preferred implementation of a block in the local class data base shown in FIG. 8.

FIG. 9 shows a preferred arrangement of block 900 which could be block 820, 822, or 824. Block 900 includes a directory 910, located at the beginning of block 900, to identify the location of the objects within the blocks, and an object storage portion 920.

Entries 955 and 965 in directory 910 each correspond to a different object 950 and 960 located in object storage portion 920 of block 900. Each directory entry includes a value for an ID field 912, which identifies the corresponding object, a value for an OFFSET field 915, which represents the relative location of the corresponding object in the block 900, and a value for a SIZE field 917 which indicates the amount of block 900 allocated to the corresponding object.

Objects 950 and 960 are preferably formatted as character string, although other techniques can be used.

Referring again to FIG. 8, local class data base 800 preferably contains a NAME-TO-ID-INDEX 830 which allows objects to be retrieved by correlating their name to object identifiers.

The object identifiers are included in the ID-TO-BLOCK NO. MAP 840. The map 840 provides block numbers for each unique object identified in the local class data base 800.

The remaining field in the local class data base 800 is BLOCK TABLE 850. BLOCK TABLE 850 preferably includes the locations of the blocks 820, 822, and 824 and the locations of the available space 829 within the local class data base 800. Available space 829 is the unused space of the block storage space 815 allocated by the local class data base 800.

To retrieve an object from local class data base 800, the name for that object is mapped to the NAME-TO-ID-INDEX 830. The identifier information from the NAME-TO-INDEX 830 is then mapped to the appropriate block number using the ID-TO-BLOCK NO. MAP 840.

The mapping yields the block number where the desired object currently resides. Once the block with the desired object is located, the object is found using the object directory 910 (FIG. 9).

(3) Loader/Unloader

Figure 10:
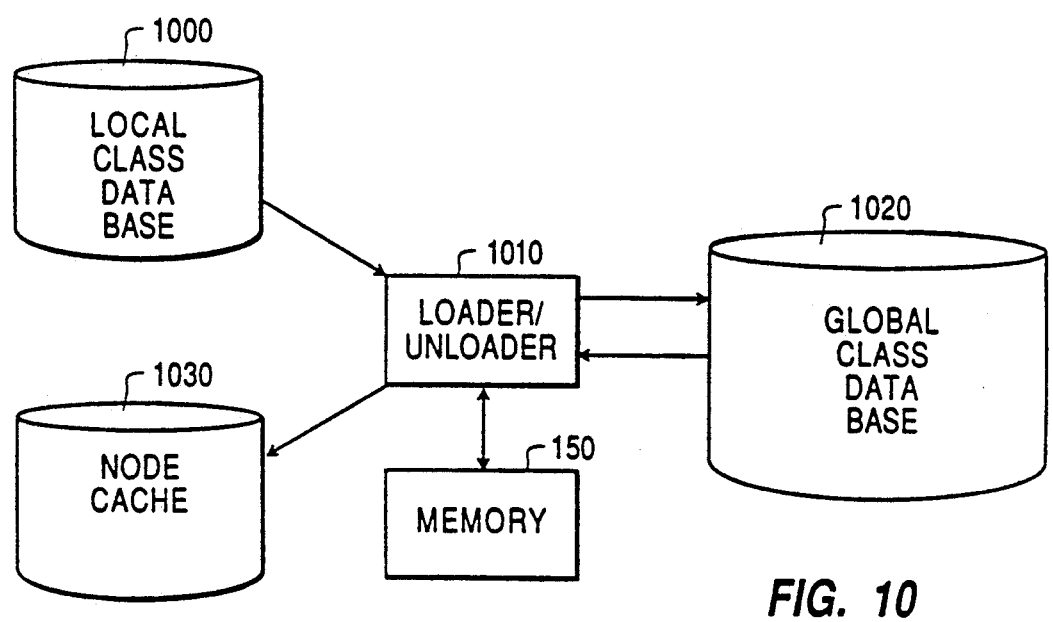
FIG. 10 is an illustration of the function of a loader-/unloader for a global data base, a local data base, and a node cache.

As shown in FIG. 10, preferably a LOADER/UNLOADER software component 1010 is coupled between a local class data base 1000, a global class data base 1020, and a node cache 1030. The LOADER/UN- LOADER software component 1010, which is part of the ACAS software components 130, 230, and 330 (FIG. 1), is used to control the transfer of ACAS information to and from the local data base 1020, the node cache 1030, and the global class data base 1020. In the preferred implementation, the LOADER/UNLOADER software component 1010 permits the local class data base 1000 to load information into the global class data base 1020, and permits the node cache 1030 to retrieve class data base information from the global class data base 1020. During loading and unloading the LOADER/UNLOADER component 1010 preferably uses memory 150 for storage.

The LOADER/UNLOADER software component 1010 is activated by a user wishing to transfer class information in local class data base 1000 to the global class data base 1020. The transfer makes information previously accessible only to the platform accessible to all network users through global class data base 1020. Transfer of class information from the local class data base 1000 to the global class data base 1020 is preferably achieved by sending class and method object definitions in an ASCII format to the LOADER/UNLOADER software component 1010 for loading into the global class data base. The LOADER/UNLOADER software component 1010 preferably executes a process to parse language definitions stored by the local class data base, and translates those definitions into an appropriate ASCII representation. The LOADER/UNLOADER 1010 then formats this ASCII representation to be stored in an appropriate format by the global class data base.

LOADER/UNLOADER software component 1010 must also respond to requests from the user to unload or to retrieve information from the global class data base 1020 for loading into node cache 1030. The retrieved information is preferably translated by the LOADER/UNLOADER software component 1010 into language definitions which are stored into the node cache 1030.

F. Creating Defining/Registering Classes and Methods (1) Creation

Preferably classes are defined using non-procedural language, such as that used in the LOADER/UNLOADER, and are then compiled and loaded into a class data base. The language, compiler and loader software are preferably components of an object definition facility. Other well-known techniques would also be apparent to those of ordinary skill in the art.

The object definition facility is part of the ACAS software components 130, 230, and 330 (FIG. 1) and provides a means to define classes, messages, class attributes, methods and method attributes. This facility also provides for the specification of inheritance among classes and, along with the LOADER/UNLOADER software component 1010 described above, can be used to modify existing definitions within the global class data base and the local class data base. In addition, the object definition facility preferably performs the necessary syntax checks of class definition input and method definition input used to create new class and method definitions within the global class data base.

A user of the object definition facility must specify certain information to create a class. This information preferably includes: a global class name and identifier; global names and identifiers (if any) of the superclasses of this class; messages supported by this class, along with their associated types of arguments (if any); method maps defined and the messages to which each map relates; and attributes defined for this class.

Each message is preferably specified by generating a structure including the name of the message, parameters supported by the message, and a corresponding method map. Each message structure is converted into two sets of values in the preferred implementation. One set of values includes the message name and the list of parameters supported by the message. The other set of values identifies a set of method objects that represent implementations of the message.

Method objects are defined within the network environment in the same manner as classes. The object definition facility of the preferred implementation, however, has special provisions for defining of method objects. The following information is specified when defining a method object; the global name and identifier of the method object; global names and identifiers of the superclasses of the method object; and metadata (i.e., descriptions of data) stored as the method attributes. The method definition also specifies the arguments and their types corresponding to the parameters in the message, and whether the method involves a parameter list. This parameter list represents the input required by the executable code (discussed below) capable of being invoked by the method.

(2) Method/Class Definition

In the preferred implementation, the loading of class and method definitions may either be done prior to run-time or dynamically during run-time. Classes and method objects may be accessible either locally on a node within the network (called "local definition") or globally from all platforms in the network (called global definition"). Both local and global definition can be accomplished using the LOADER/UNLOADER software component 1010 or any other acceptable mechanism.

(3) Server Registration

The purpose of server registration is to find method servers which are available to service requests from messages. Method servers are the active (i.e., currently running) processes implementing the methods. A method server may involve execution of the code of a single application or of many portions of the code of one or more applications.

The registration of method servers is distinct from the definition of classes and method objects. Whereas the definition of classes and method objects is used to identify their presence in the system, the registration of method servers is used to track their status (i.e., availability). If a method server is not registered, it is not known to the system.

(4) Application Installation & Definition

Preferably, support mechanisms are provided for registering and installing applications in the network. The preferred implementation provides the ability to define applications and application fragments in the object-oriented model of classes, subclasses, messages and methods stored in a class data base. The definition of applications in this manner is critical to the operation of the interapplication communication performed by the preferred implementation of this invention. Specifically, the storage of classes, subclasses, messages and methods in a class data base permits an application, during run-time, to update the class data base and continue processing using the updated class data base without having to recompile and relink.

Applications are defined in the same manner as other classes. In fact, as explained above, an application is itself defined to be a particular kind of class.

Applications are installed on specific platforms in the manner required for the particular operating system on that platform. In the preferred implementation of this invention, application installation also requires some additional functions. For example, unless it has already been defined, an application must provide its own class definition which is defined as a subclass of the existing ACAS_APPLICATION.

Application installation may use class definitions already installed or may add new definitions. At application installation time, an installation procedure may compile and register the class definitions supported by the application into either a local class data base or the global class data base using the LOADER/UNLOADER software component 1010 described above, and must update the method maps of the data object classes affected by the new applications. Application installation also involves the method object definition procedures discussed above.

G. Context Object Data Bases

In the preferred implementation of this invention, context object data base 630 (see FIG. 6) provides a mechanism to define preferences to be used for resolving methods, for selecting platforms to execute a method, and for locating class data bases in the network. Several levels of context object data bases can exist in the network 50 of FIG. 1. For example, one level may consist of a user context object data base and another level may consist of a group context object data base. System (or platform) context object data bases may also be used to identify preferences for users of the entire platform. All context object data bases supply preferences during method resolution, but, the group context object data base may be used by the ACAS software components 130, 230, and 330 to recognize the preferences of more than one user, and the system context object data base may be used to recognize the preferences of more than one group. Preferably, the data bases in context object data base 630 are used such that in method resolution, preferences in the user context object data bases override those in the group context object data bases, which in turn overrides the system context object data bases.

Context object data base 630 preferably resides on the platform associated with a user during a particular network session. In the initial log-on procedure executed when a user enters the network, the information stored in the context object data base associated with the user is called up for later use during the operation of the ACAS software.

Figure 11A:
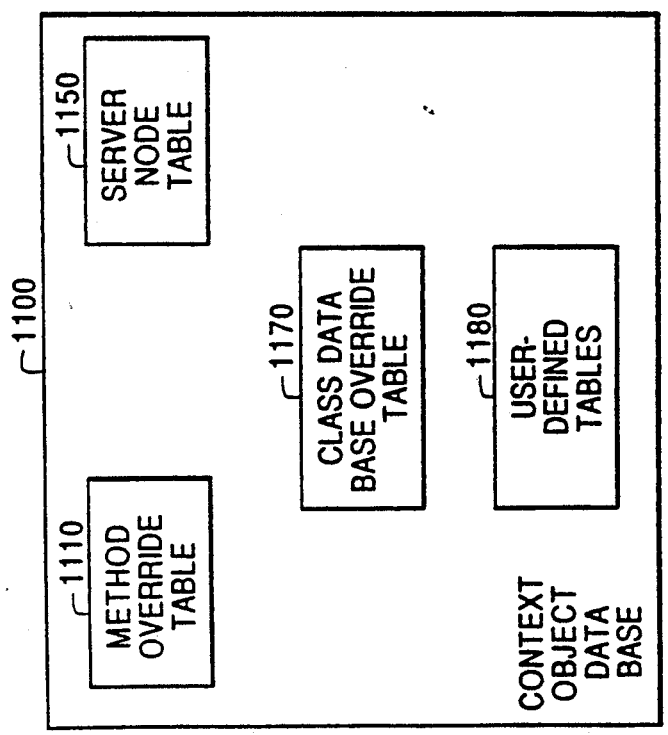
FIG. 11A is a diagram illustrating a preferred implementation of a context object data base.

FIG. 11A shows a preferred memory system for a context object data base 1100. The context object data base 1100 includes a method override table 1110, a server node table 1150, and a class data base override table 1170, and other user defined tables 1180. The method override table is used during method resolution, described in detail below, to select a preferred method in response to a message name and a class identified in an instance handle. The server node table 1150 is used during the invoker operations, also described in detail below, to select and locate platforms in the network capable of being a server platform. Class data base override table 1170 defines an order for searching the local class data bases for method and class information.

Tables 1110, 1150, and 1170 are system-supplied tables. Users may also supply their own tables 1180 to effect their specific preferences.

A preferred implementation of a method override table 1110 is shown in FIG. 11B. Method override table 1110 includes a list of method selector attribute names 1115 and associated values 1120. Each entry specifies for an attribute name 1115, a preferred value 1120. For example, in FIG. 11B, the preferred platform is specified as a VAX.VMS, and the preferred interaction type is BUILT_IN. If more than one method is identified in response to a message, the preferences in table 1110 will be used to choose one of those methods. If no value is specified for an attribute, the system assumes there is no preference.

A preferred implementation of a server node table 1150 of the context object data base 1100 is shown in FIG. 11C. Server node table 1150 is an ordered list of nodes in the network 50 of FIG. 1. Each of the entries in table 1150 corresponds to a platform type 1152 and the location of nodes 1154 in the network 50 with the corresponding platform type which can be used to implement the selected method. For example, table 1150 identifies two nodes for a platform type of TYPE A, node a and node b.

FIG. 11D contains a preferred implementation of class data base override table 1170. Table 1170 includes several entries which include a name of a local class data base 1172 and its location 1174. Thus, for entry 1175, the data base DB_SCH_LST is at locations db1 and db2, and is searched before other local class object data bases listed further down table 1170.

The preferred implementation of the present invention includes an interface available to all users of the network which provides the capability to create context object data bases and to add, modify and delete entries within each of the system context object data bases. This interface preferably executes a standard compiler to perform these functions. For example, to add an entry to a context object data base, a user would enter a command using the provided interface. The command would then be interpreted by the ACAS software components 130, 230, and 330 (FIG. 1) to cause the standard compiler to translate the data received by the interface into the proper formats.

H. ACAS Service

(1) General Operations

With the preceding description of certain components of the preferred implementation of this invention, a fuller understanding of the ACAS components may be gained. Preferably, the present invention is implemented using a client/server model in which a client generates requests and a server responds to requests. In the following discussion, the service or operation associated with a client application on a client platform is called the "client service," and the service or operation associated with a server application executing on a server platform is called a "server service." The client service and the server service of the preferred implementation rely upon a transport system which is capable of transmitting messages from the client platform to and from the server platform. In the preferred implementation, an RPC-like communications system is used as the transport system.

Each of the ACAS software components 130, 230, and 330 shown in FIG. 1 preferably includes client service components and the server service components which represent the client and server services, respectively. This is shown, for example, in FIG. 12 which is a diagram of two platforms 1200 and 1300 and a network bus 55. Platforms 1200 and 1300 can correspond to any of platforms 100, 200, or 300 in FIG. 1.

Located in platforms 1200 and 1300 are memories 1250 and 1350, respectively, and CPUs 1210 and 1310, respectively. The elements in the platforms 1200 and 1300 function in the same manner as similar elements described above with reference to FIG. 1. CPU 1210 executes a client application 1220 and CPU 1310 executes a server application 1320. CPUs 1210 and 1310 also execute OP SYS 1 1240 and OP SYS 2 1340, respectively, and ACAS software components 1230 and 1330, respectively.

ACAS software components 1230 and 1330 preferably include dispatcher software components 1232 and 1332, respectively, control server software components 1234 and 1334, respectively, invoker software components 1236 and 1336, respectively, and the auxiliary software components 1237 and 1337, respectively.

For the most part, invoker software components 1236 and 1336 represent the client service and dispatcher software components 1232 and 1332 represent the server service. The auxiliary software components 1237 and 1337 represent some other operations of the preferred implementation. Since platforms 1200 and 1300 in the network contain an invoker software component 1236 and 1336, respectively, a control server software component 1234 and 1334, respectively, and a dispatcher software component 1232 and 1332, respectively, either platform can act as a client or a server.

In the preferred implementation, the invoker software components 1236 and 1336 and the dispatcher software components 1232 and 1332 have the responsibility for interpreting class and method information in the class data bases, as well as context data in the context object data base, to determine the appropriate method to invoke, to determine how to invoke that method, and to dispatch the necessary commands to execute the code to implement the method. The invoker software components 1236 and 1336 and the dispatcher software components 1232 and 1332 also insulate client applications from the details of the method invocation and the transport level mechanisms.

The control server software components 1234 and 1334 have several functions. One function is to store information on currently running server applications on the platforms 1200 and 1300 in the network 50. The control server software components 1234 and 1334 also execute processes to start new applications that become method servers. Another function performed by control server software components 1234 and 1334 is method server registration. For example, the control server software component 1334 stores information regarding the method Server, identified by the server application 1320, currently running on the server platform 1300. The control server software component 1334 also communicates with the server registration facility in network-wide memory 704 (FIG. 7) to store status information regarding the server application 1320.

The auxiliary software components 1237 and 1337 represent operations of the ACAS software components 1230 and 1330 such as class and method object definition and registration, method executable registration (described below) in a method executable catalog of each platform, and functions of the LOADER/UNLOADER software component 1010 (FIG. 10).

For purpose of the following discussion, the platform 1200 is referred to as the client platform and the platform 1300 is referred to as the server platform. In this example, the client application 1220 communicates with the server application 1320 in the server platform 1300 in an objected-oriented fashion. It is also possible in accordance with the present invention and in the preferred implementation for a client application on one platform to communicate with a server application on the same platform.

Figure 12:
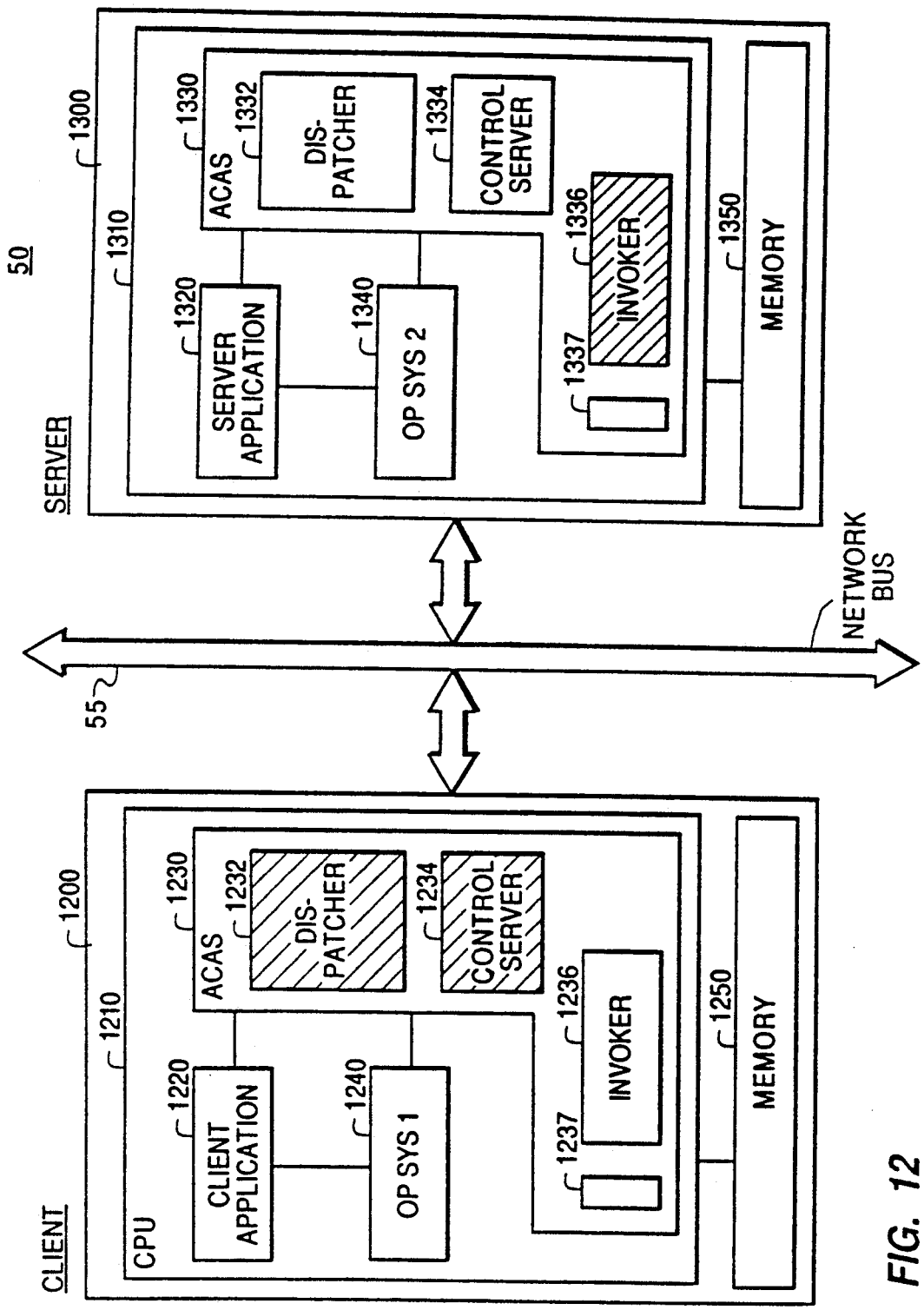
FIG. 12 is a diagram of individual software components in the platforms of the network.

When the client application 1220 communicates with the server application 1320, the dispatcher software component 1232 and control server software component 1234 of the client platform 1200 is not involved, and are therefore shaded in FIG. 12. Likewise, invoker software component 1336 of the server platform 1300 is shaded because it is not active.

Figure 13:
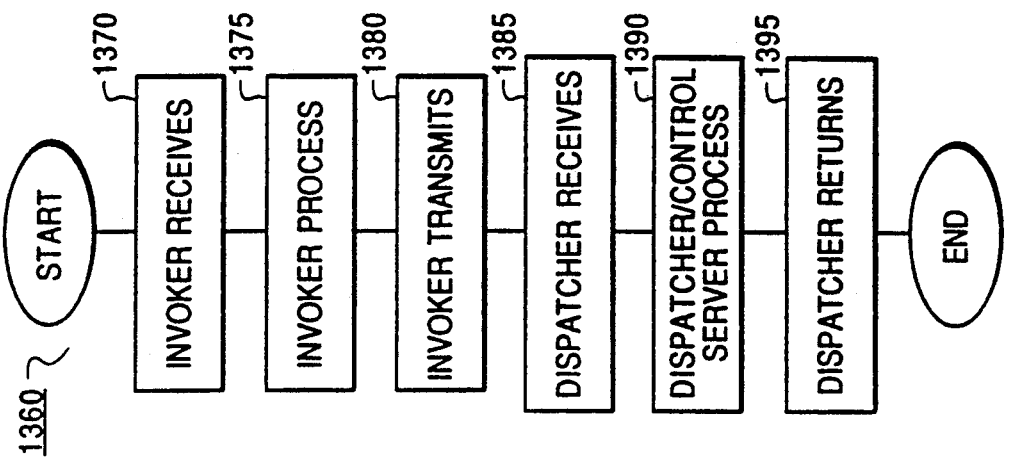
FIG. 13 is a flow diagram of the general operation performed by the preferred implementation of this invention for remote invocation of applications.

FIG. 13 is a flow diagram 1360 outlining the major functions performed in an invocation of a method according to the preferred implementation. Prior to beginning the steps in flow diagram 1360 the ACAS software components 1230 and 1330 are initially in a "wait" state.

When the client application 1220 transmits a method invocation request, the processes of the ACAS software components 1230 and 1330 shown in FIG. 13 begin. This method invocation request includes an input message which identifies the desired operation of the client application 1220.

First, the method invocation request is received by the invoker software component 1236 (step 1370) which processes the method invocation request (step 1375). The invoker process is described in greater detail below. The usual result of the invoker process is a processed method invocation request.

The invoker software component 1236 then transmits the processed method invocation request, via network bus 55 to the dispatcher software component 1332 (step 1380). The dispatcher software component 1332 and control server 1334 then begin their operations.

After receiving the processed method invocation request, the dispatcher software component 1332 and control server software component 1334 cause the method identified by the invocation request to be executed by the server application 1320 (step 1390). Once the server application 1320 completes execution of the method, it outputs any arguments resulting from the execution and the dispatcher software component 1332 generates a status message (e.g., "successful"). The output arguments and status message are mapped into the processed method invocation request, now called a "response." This response is then transmitted by the dispatcher software component 1332 to the invoker software component 1236. The invoker software component 1236 completes its processing by returning the response received from the dispatcher software component 1332 mapped into the original method invocation request, to the client application 1220 (step 1395).

Figure 14:
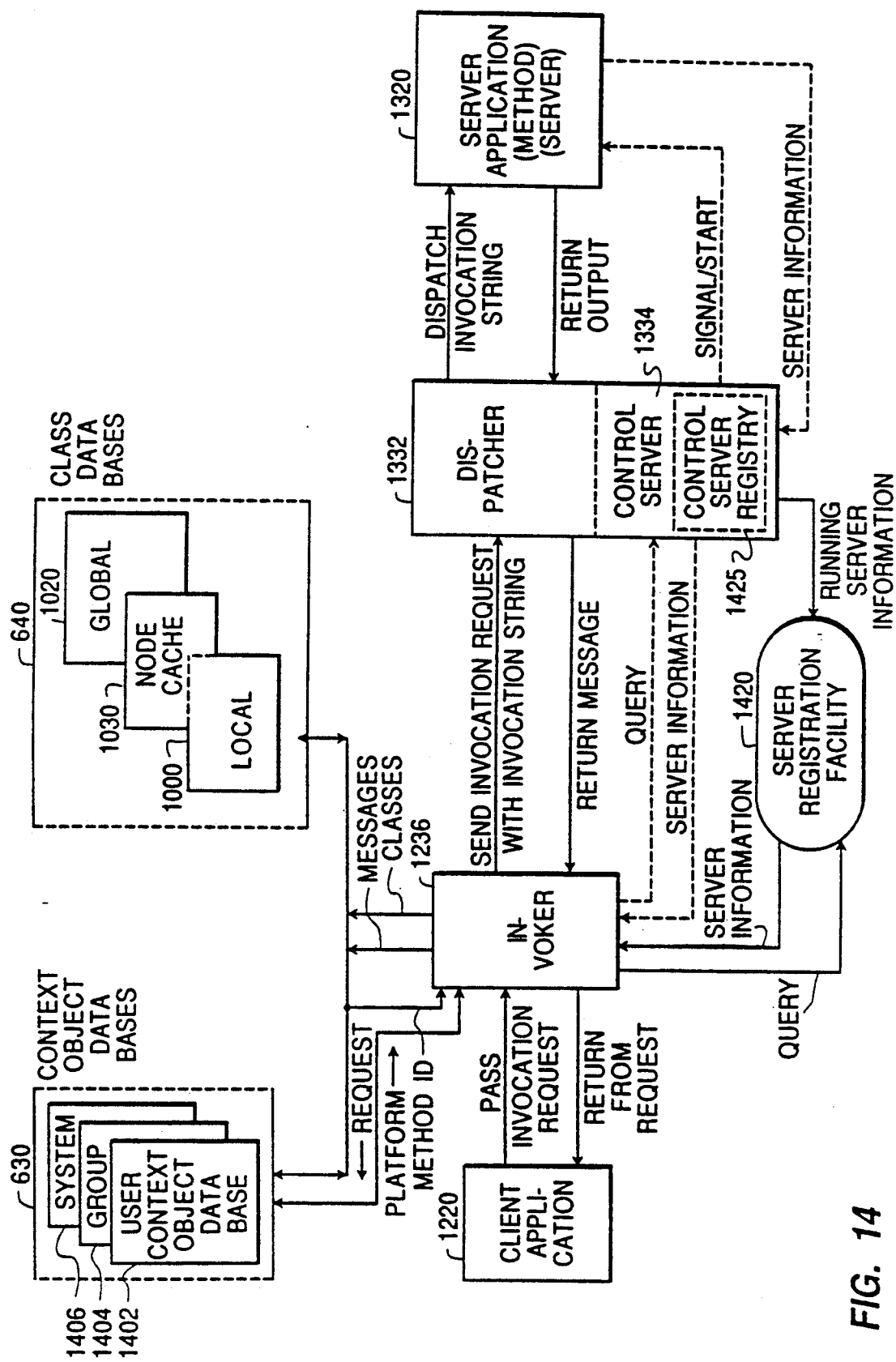
FIG. 14 is a more detailed diagram of components of the network and the flow of information.

The preceding explanation of the ACAS software components 1230 and 1330 permits a greater appreciation of the flow of information in the preferred implementation of this invention. FIG. 14 shows additional elements of the network 50 affected by a flow of information from the invoker software component 1236 to the dispatcher software component 1332. In addition to the client application 1220, the server application 1320, the invoker software component 1236, the dispatcher software component 1332, and the control server software component 1334, FIG. 14 includes context object data bases 630 (FIG. 6), class data bases 640 (FIG. 6), a server registration facility 1420, and a control server registry 1425, which is maintained by the control server software component 1334 and keeps track of the executable code in the server platform.

As shown in FIG. 14, the context object data bases 630 includes a user context object data base 1402, a group context object data base 1404, and a system context object data base 1406, each of which has been described above in the discussion of context object data bases. The class data bases 640 include a local data base 1000 (FIG. 10), a node cache 1030 and a global class data base 1020. Each of these elements of class data bases 640 has been described above in the discussion of class data bases.

As explained above, the flow of information begins when client application 1220 generates a method invocation request which is passed to invoker software component 1236. This interface is preferably provided by an InvokeMethod procedure call of the preferred implementation.

In the InvokeMethod procedure call, the client application 1220 passes to invoker software component 1236 an instance handle, a message (including a message name, and parameter list), a context object handle, and, optionally, an output instance handle.

As discussed in detail above, the instance handle is a structure that identifies the current instance the client application 1220 has selected to be involved in the method invocation. The message name represents the desired operation on the instance. The message parameter list consists of the parameters required by the message. The context object handle is a reference identifying the context object data base to be used in the invocation process described in detail below. The output instance handle represents an instance of the running method server associated with the invoked method. This allows the client application to continue to have a dialog with the same method server. The semantics of the output instance handle is the same as that for the instance handle.

When the invoker software component receives the method invocation request, the invoker software component 1236 queries the context object data bases 630 and the class data bases 640 to find a method identifier. This procedure has been discussed above.

Having determined the appropriate method identifier for the message name, the invoker software component 1236 next queries the server registration facility 1420 and the context object data base 630 to find the server platform on which to execute the method associated with the method identifier. The server registration facility 1420 is used to locate a running method server (if any) capable of performing the method associated with the method identifier. A running method server is a method server, such as the server application 1320, that has made itself known to the network 50 as being already started.

If there is a running method server, the invoker software component also queries server platform tables of the context object data base 630, to determine the location of a remote platform in the network 50 (FIG. 1) which the user of the client application 1220 would prefer to execute the method of invocation request processed by the invoker software component 1236. If however, the server application 1320 is not available, the control server software component 1334 notifies the invoker software component 1236 that the server application is not available on the selected remote platform. The invoker software component 1236 processing outlined above begins again with querying the server platform table of the context object data bases 630 and server registration facility 1420 to select another platform in the network 50 upon which to execute the identified method.

Next, the invoker software component 1236 transmits a query to the control server software component 1334 of the preferred server platform which causes control server software component 1334 to query a control server registry 1425 to determine whether the desired method server on the preferred server platform is available to process the method identified in the processed method invocation request. Availability of a method server is determined in the preferred implementation by examining in the control server registry 1425 to find out whether the method server is currently able to process methods invoked by client applications.

If the control server software component 1334 indicates to the invoker software component 1236 that the method server, in the form of server application 1320, is available, the invoker software component 1236 transmits the processed method invocation request to the dispatcher software component 1332 of the server platform. The invoker software component 1236 can also transmit information from the context object data base 630, which can then be used by the desired method server.

The dispatcher software component 1332 then begins to process the desired method. This process, referred to as the "dispatching process," generally involves dispatching the method identifier to begin the execution of the method by the server application 1320.

If, however, the server registration facility 1420 does not indicate that any copies of server application 1320 and currently running on a platform in the network, then the invoker software component 1236 may transmit a request to the control server software component 1334, using the information retrieved from the context object data bases 630 and the class data bases 640, to start the server application 1340. After the server application 1320 is started, the control server software component 1334 notifies the server registration facility 1420 to update the network-wide memory 704 (FIG. 7) to indicate that the server application 1320 is running. Control server software component also updates the control server registry 1405 to indicate that the server application 1320 is available. The invoker software component 1236 then transmits the processed method invocation request to the dispatcher software component 1332 to execute the method corresponding to the method identifier of the processed method invocation request.

After the server application 1320 has completed its processing, it returns any output information requested by the processed method invocation request to the dispatcher software component 1332. The dispatcher software component 1332 then returns a response, as describe above, to the invoker software component 1236 along with any output information mapped into the output arguments of the processed method invocation request received by the dispatcher software component 1332.

(2) Invoker Operation

The portion of the process of method invocation performed by the invoker software component 1236 can now be described in greater detail. Preferably, that portion consists of several distinct phases including determining the proper method to be invoked (method resolution), server connection or start-up, and transport level communications to enable the dispatching of an identifier to the proper method to be executed by the method server or other executable code.

FIGS. 15A–15D and 16 contain flow diagrams of procedures performed or called by the invoker software component 1236 of FIGS. 12 and 14. The main control procedure 1550 in FIGS. 15A–15D represents the steps 1370, 1375, and 1380 (FIG. 13) performed by invoker software component 1236.

As with procedure 1360, prior to entering the main control procedure 1550, the client application 1220 (FIGS. 12 and 14) is running normally without a method invocation request, and the ACAS software component 1230 is in a "wait" state. When the client application 1220 generates a method invocation request using the InvokeMethod procedure call, the main control procedure 1550 begins (step 1552 in FIG. 15A) with the invoker software component 1236 receiving the method invocation request (step 1555).

The invoker software component 1236 first validates the method invocation request (step 1557). If there was an error, the invoker software component 1236 generates an error message (step 1558) which the invoker software component 1236 returns to the client application 1220 (step 1599 in FIG. 15D).

If the method invocation request is valid (step 1557 in FIG. 15A), the invoker software component 1236 next resolves the method to be invoked from the message in the InvokeMethod call, the class data bases, and context object data bases (step 1560). Method resolution is the process of determining or identifying the appropriate method.

Figure 16:
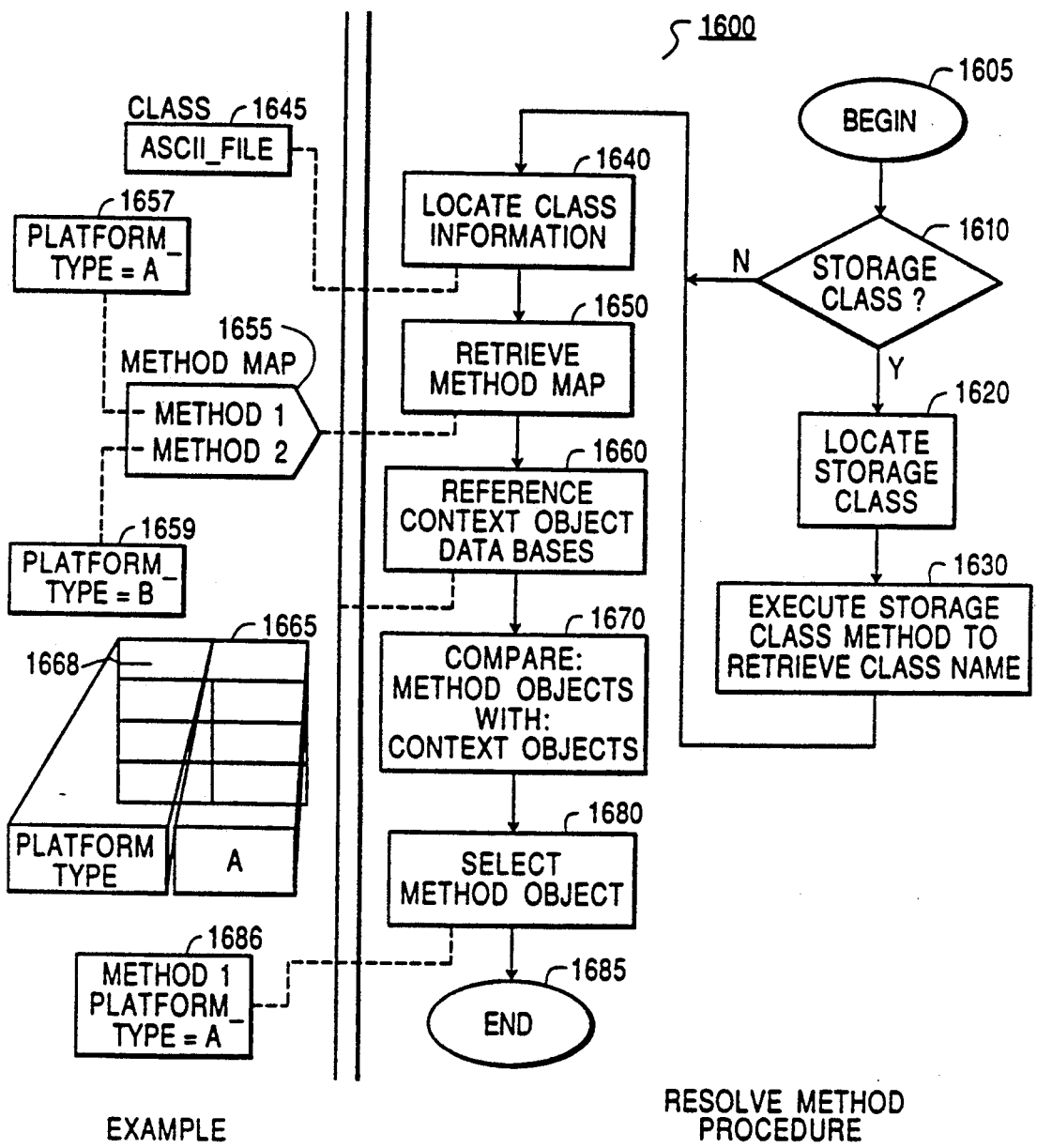
FIG. 16 is an illustration of the steps performed by the invoker software component in FIG. 14 to resolve a method.

FIG. 16 shows a preferred procedure 1600 to resolve methods. Although method resolution has been referred to above, procedure 1600 shows such resolution in much more detail than has been provided.

In the preferred implementation, the determination of the proper method to be invoked is indirectly handled by the invoker software component 1236. Most of the work for method resolution is then handled by the auxiliary software components 1237 and 1337 of the ACAS software components 1230 and 1330. In the preferred implementation, auxiliary software component 1237 retrieves information from the context object data bases and the class data bases. Of course, invoker software component 1236 could also retrieve such information.

After beginning the method resolution procedure 1600 (step 1605), the invoker software component 1236 determines whether the instance handle includes the storage class name portion (step 1610). If a storage class exists, it is located (step 1620) a special method is invoked to retrieve the name of the class associated with the instance handle (step 1630).

After invoking the method identified by the storage class to retrieve the class name, or after determining that the instance handle did not include the storage class name, a process is executed by the invoker software component 1236 to locate class information for the class data bases 640 (FIGS. 6 and 14) using the searching order described above (step 1640). For example, if the messages was EDIT (INSTANCE_HANDLE), where the instance handle was ASCII_FILE/-NODE_1/MYFILE.TXT, the class name ASCII_FILE can be used to find class ASCII_FILE 1645 in class data bases 640.

With the name of the message, EDIT, the appropriate method map 1655 is then retrieved from the class data bases 640 (step 1650). In the specific example under discussion, the auxiliary software component 1237 of the preferred implementation would then retrieve method map 1655 and check to ensure that the class information located in step 1640 includes with the message name EDIT. This ensures that the corresponding message is supported by the class.

As FIG. 16 shows, the method map 1655 includes method objects METHOD 1 and METHOD 2 for the message name EDIT and the class ASCII_FILE 1645. Associated with the method object METHOD 1 is a set of attributes 1657 and associated with method object METHOD 2 is a set of attributes 1659. The set of attributes 1657 indicates that METHOD 1 is capable of being executed on PLATFORM_TYPE A, and the set of attributes 1659 indicates that Method 2 is capable of being executed on PLATFORM_TYPE B.

Because there might be several method objects in the method map, the context object data bases 630 are referenced to resolve any ambiguities (step 1660). In referencing the context object data bases 630, the appropriate server node table maintained is also retrieved to be used later.

The entries (if any) in the context object data bases 630 are then compared with the attributes in set of method objects on the method map (step 1670) to select the method object and thus the appropriate method to execute the desired operation represented by the message (step 1680). In FIG. 16, a method override table 1665 includes an entry 1668 indicating the user preference is for PlatformType A. Using this entry 1668 the invoker software component 1236 selects from the class data bases 640 the appropriate method 1686 to execute the desired operation EDIT. In the example shown in FIG. 16 the appropriate method is Method 1 to be executed on PLATFORM_TYPE A. The procedure 1600 now returns to the main control procedure of 1550 of FIG. 15 (step 1685).

If at any point during the operation of method resolution procedure 1600, there is an error (such as during step 1640, the class identified in the instance handle was not a class locatable in the class data bases), the method resolution procedure 1600 returns with a message indicating this error.

Figure 15A:
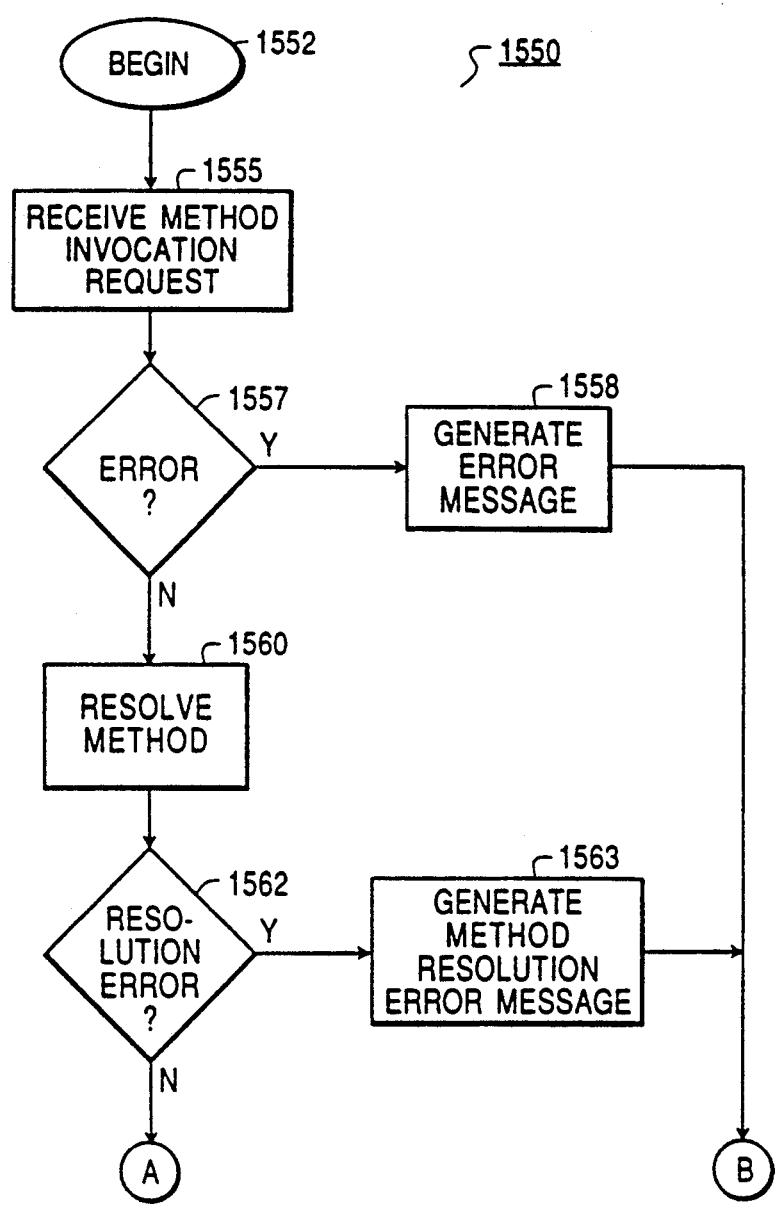
FIGS. 15A through 15D are a flow diagram of the procedure performed by the invoker software component in FIG. 14.
Figure 15B:
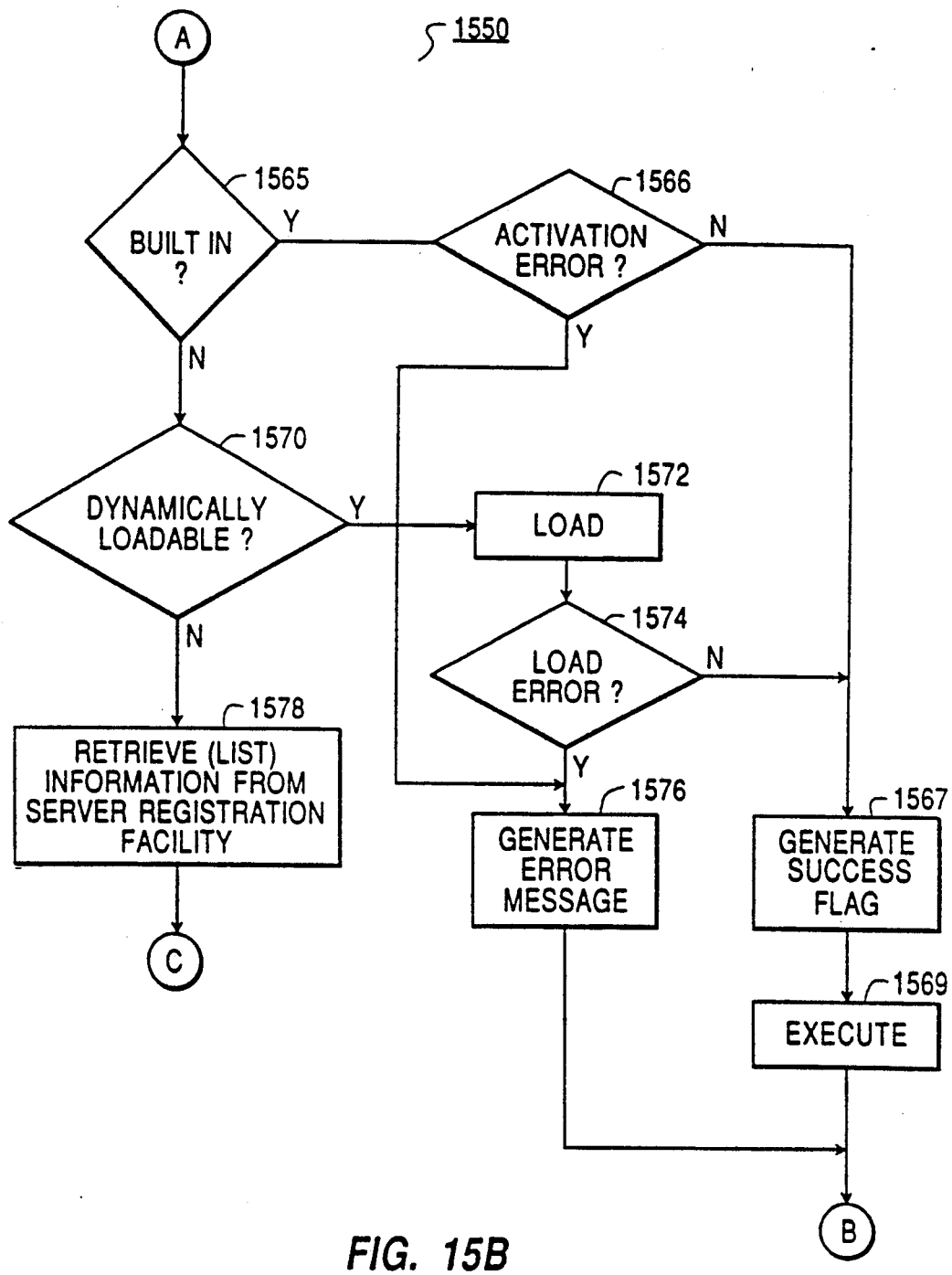
Figure 15C:
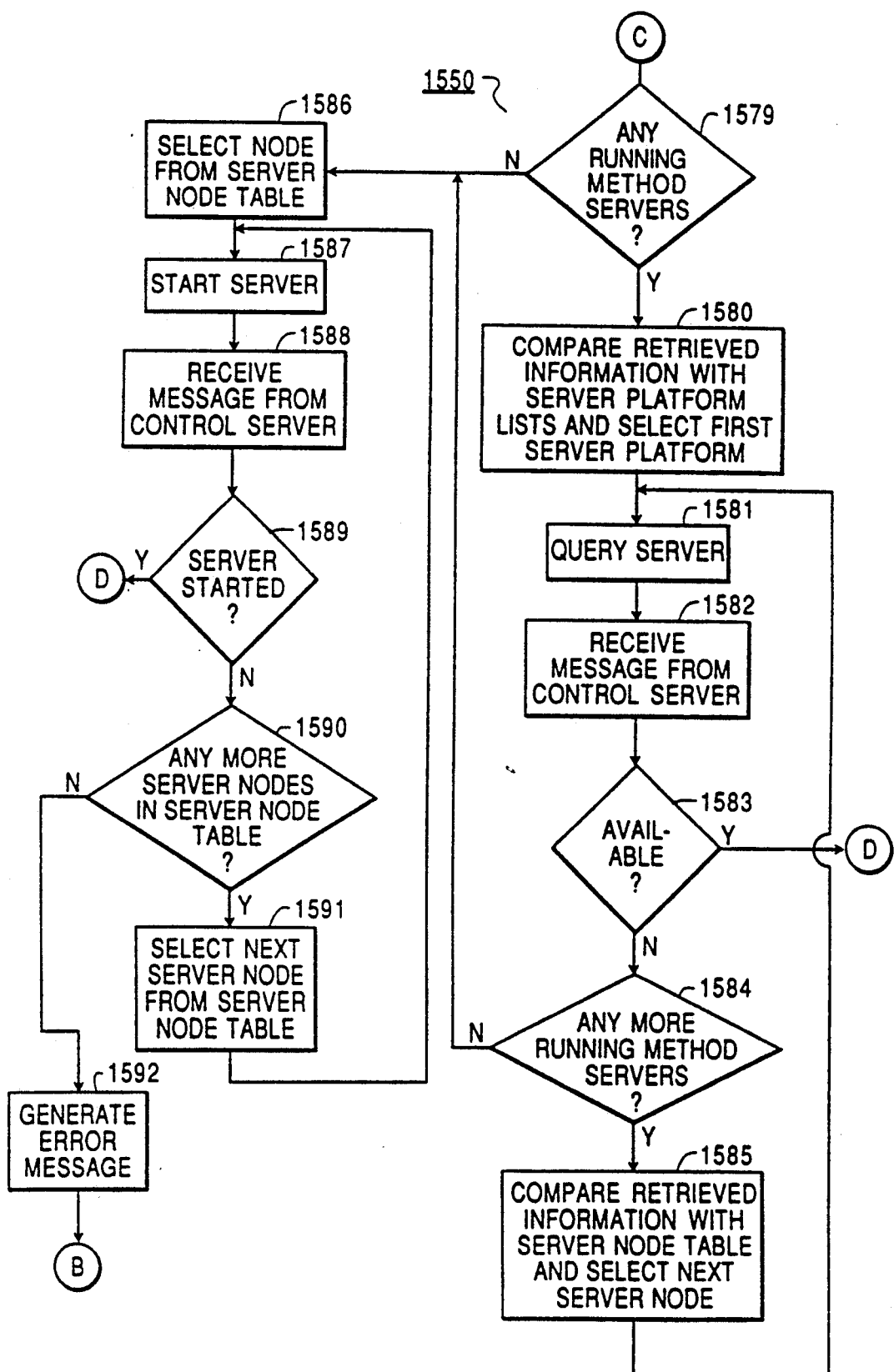

After returning from the method resolution procedure 1600, a determination is made whether an error occurred during the method resolution process (step 1562 in FIG. 15A). If the answer is "yes", then the invoker software component 1236 generates the appropriate error message (step 1563), and returns the error message to the client application 1220 (step 1599 in FIG. 15D).

Otherwise, having resolved the method without error (step 1562 in FIG. 15A), the invoker software component 1236 then reviews the method attributes corresponding to the identifier of the resolved method to execute the appropriate method on an appropriate platform in the network. If these method attributes indicate that the method is already linked into the client application 1220 (step 1565 in FIG. 15B), for example, the value of the InteractionType method attribute is "BUILT_IN," then a check is made for an activation error (step 1566). If there was one, an error message is generated (step 1576) and control is returned to client application 1220 (step 1599 in FIG. 15D).

If there was no error, a success flag is generated (step 1567), and the resolved method is executed by code already resident in the client application 1220 (step 1569).

If the method attributes do not indicate that the method is already linked to the client application 1220 (step 1565 in FIG. 15B), invoker software component 1236 asks whether the method attributes indicate that the method is dynamically loadable (step 1570). Dynamically-loadable methods represent method executables which may be merged with executable code of client applications at run-time Those skilled in the art will recognize that a dynamically-loadable method might be a method executable identified by a subprocedure or function of a client application. Preferably the test for a dynamically-loadable method server is accomplished by determining whether the value of the InteractionType method attribute is "DYNAMIC_LOAD." If so, then the invoker software component 1236 attempts to load the executable code identified by the resolved method into the client application 1220 (step 1572).

Figure 15D:
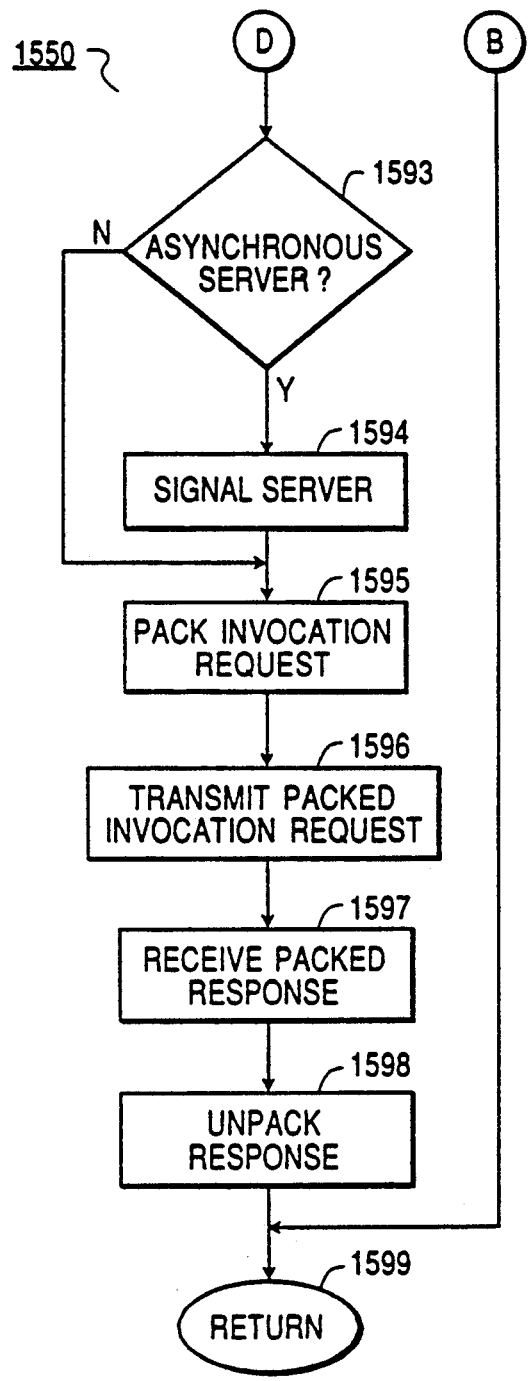

If an error occurred during the loading of the executable code (step 1574), then the invoker software component 1236 generates a message indicating that a load error occurred (step 1576) and returns the load error message to the client application 1220 (step 1599 in FIG. 15D).

Otherwise, if there was no load error (step 1574), then the invoker software component 1236 then generates a flag indicating the successful completion of the method invocation (step 1567). Next, the dynamically loaded executable code corresponding to the resolved method is executed (step 1569), and control returns to the client application 1220 along with any output arguments (step 1599 in FIG. 15D). Any errors in executing linked or dynamically-loadable method servers are preferably returned as parameter values.

If the method attributes do not indicate a previously-linked or dynamically-loadable method (steps 1565 and 1570 in FIG. 15B), then the invoker software component 1236 must locate a running method server on a platform in the network that can handle the resolved method as described above with regard to FIG. 14.

If the information retrieved from the server registration facility 1420 (step 1578) indicates that there is at least one running method server capable of performing the method identified by the resolved method (step 1579 in FIG. 15C), then the invoker software component 1236 compares the information retrieved from the server registration facility 1420 with the entries on the server node table retrieved from the context object data bases 630 during the method resolution procedure 1600 to select a server platform in the network (step 1580).

Having selected a server platform, the invoker software component 1236 then transmits a QueryServer call to the control server software component 1334 of the selected server platform (step 1581). The functioning of the control server software component 1334 is described in detail below in connection with FIGS. 17A and 17B. Briefly, control server software component 1334 determines whether the desired method server is available or not.

The main control procedure 1550 of the invoker software component 1236 then continues in step 1582 (FIG. 15C) by receiving a message generated by the control server software component 1334 about the desired method server's availability and translating the message into a format recognizable by the client platform. The invoker software component 1236 determines from the control server software component 1334 whether the method server corresponding to the resolved method is available to process the method identified by the resolved method (step 1583). If the corresponding method server is available, then processing of the invoker software component continues on FIG. 15D by asking whether the method server is an asynchronous method server (step 1593) in FIG. 15D. Asynchronous method servers are known in the art.

If the method server is asynchronous (step 1593), then the control server software component 1334 is called using the SignalServer call to signal the method server (step 1594). If the method server is not asynchronous (step 1593), or after an asynchronous method server is signaled (step 1594), the processed method invocation request, including the identifier for the method and information retrieved from the context object data bases during method resolution, is packed into a data structure used for communication in the network (step 1595) and the invoker software component 1236 then transmits the packed and processed method invocation request to the dispatcher software component 1332. The processes of the dispatcher software component 1332 will be described below with reference to FIGS. 18A and 18B.

After the dispatcher software component 1332 completes its processing and transmits a packed response, the invoker software component 1236 receives the packed response (step 1597), unpacks the response (step 1598), and returns the response to the client application 1220 to complete its processing (step 1599).

If in the earlier determination (step 1583 in FIG. 15C), the running method server was found not to be available, the invoker software component 1236 determines whether the server registration facility 1420 indicated any other running method servers capable of performing the method identified by the resolved method (step 1584). If so, then the retrieved information is compared to the server node table in the context object data base 630 and a QueryServer call is made to control server software component 1334 (step 1581).

Otherwise, the invoker software component selects the server node with the highest priority from the server node table (step 1586). The control server software component 1334 of that selected server platform is then contacted using the StartServer call which indicates to the control server software component 1334 to attempt to start the appropriate application which corresponds to the method identified by the resolved method (step 1587).

After the control server software component 1334 has completed its processing and transmitted a message, the invoker software component 1236 receives the transmitted message which it then unpacks (step 1588).

If the application was started and became a method server (step 1589), then the invoker software component 1236 completes its processes which have already been described (step 1593 of FIG. 15D). If the application was not started (step 1589), then the invoker software component 1236 asks whether there are any more nodes in the server node table of the context object data bases 630 (step 1590). If not, then an error message is generated indicating that the method invocation was unsuccessful because a server platform could not be located (step 1592), and that error message is returned to the client application 1220 (step 1599 in FIG. 15D).

If, however, there are other nodes. On the server node table (step 1590 in FIG. 15C) then the platform with the next highest priority is selected (step 1591) and the processing of the invoker software component 1236 returns to step 1587 of FIG. 15C. The loop consisting of steps 1587, 1588, 1589, 1590, and 1591 will be performed until the method server is started (step 1589) or until there are no more platforms on the server platform lists (step 1590).

(3) Control Server Operation

Figure 17A:
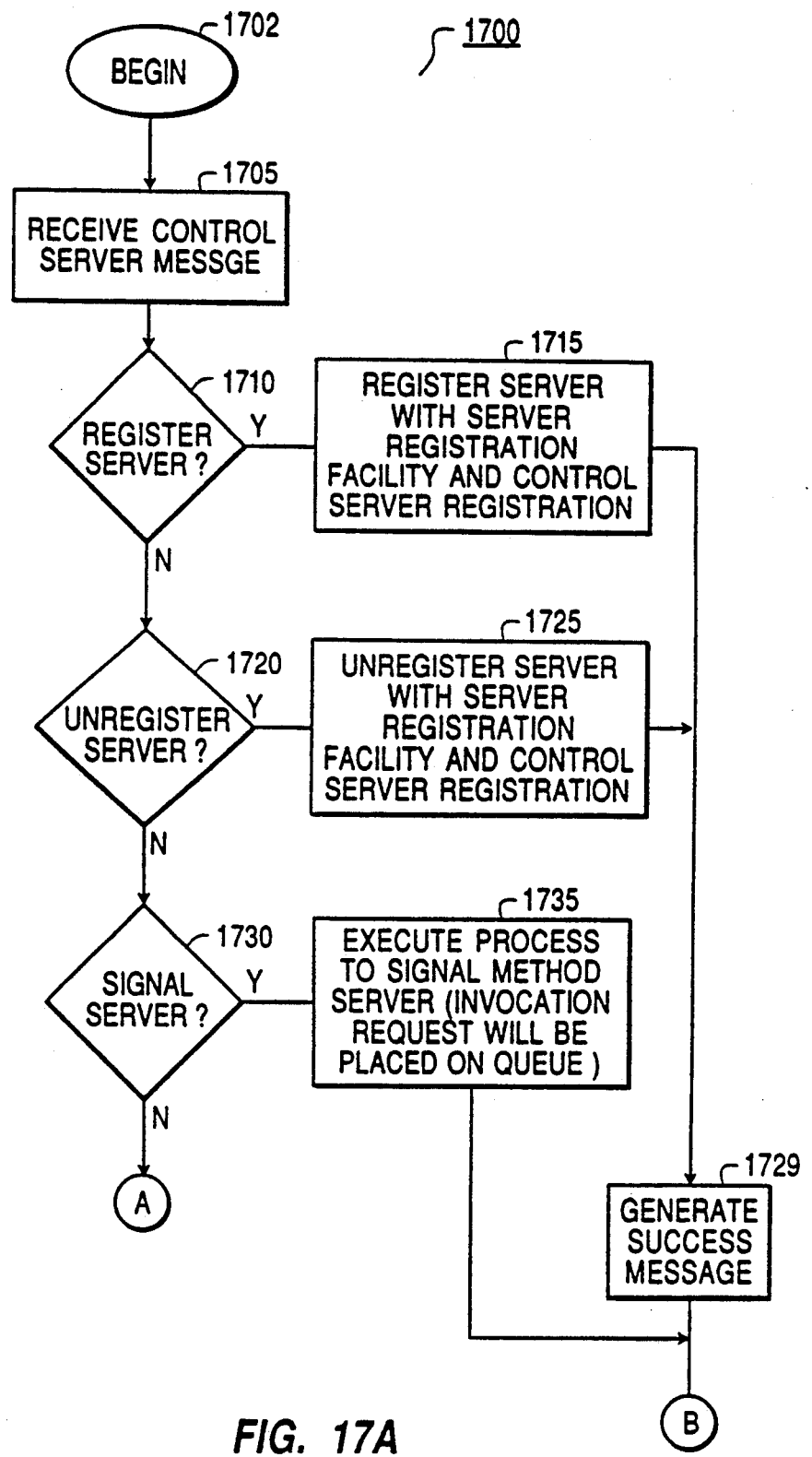
FIG. 17A and 17B is a flow diagram of the steps performed by the control server software component in FIG. 14.
Figure 17B:
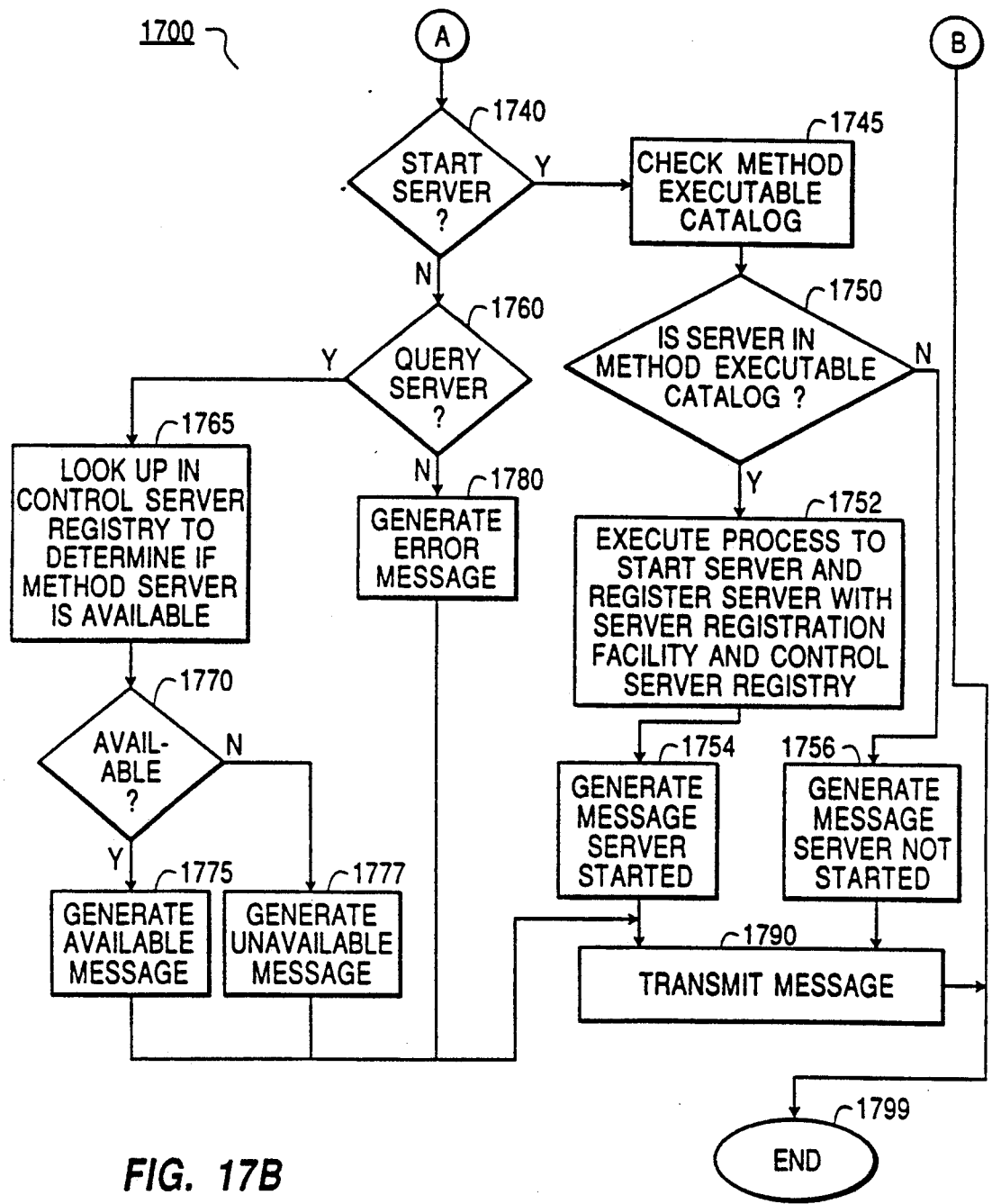

FIGS. 17A and 17B show the control server procedure 1700 which represents the operations of the control server software component 1334. Persons skilled in the art will recognize many other ways of implementing the functions of control server software component 1334.

After beginning the control server procedure 1700 in step 1702 of FIG. 17A, the control server software component 1334 receives a control server message (step 1705). In response, the control server software component 1334 determines whether the control server message indicates that an application running on a common platform with the control server software component 1334 requests to be registered as a method server to handle method invocation requests (step 1710). If the answer is "yes" then the control server software component 1334 registers the server application as a method server by recording the necessary information about the server application with the control server registry 1425 to indicate that the method server is available. Control server software component 1334 also notifies the server registration facility 1420 to indicate that the method server is running (step 1715). The running and available method server may also execute appropriate methods. The control server software component 1334 also generates a success message (step 1729) to be returned to the now registered application (step 1799 in FIG. 17B).

If the control server message does not indicate that an application wishes to be registered (step 1710 in FIG. 17A), the control server software component determines whether the control server message indicates that a currently registered method server requests to be unregistered with the control server software component 1334 and server registration facility 1425 (step 1720). If so, then the control server software component 1334 unregisters the method server by removing the information from the control server registry 1425. This indicates that the application, identified by the method server, is no longer available. Control server software component 1334 also notifies the server registration facility 1420 to remove the information stored in network-wide memory 704 (step 1725). The control server software component 1334 then generates a success message (step 1729) to be returned to the now-unregistered application (step 1799 in FIG. 17B).

If the control server message does not indicate that an application has requested to register or unregister itself, the control server software component determines whether the control server message indicates that the invoker software component 1236 wishes to signal an asynchronous method server to expect to be invoked to execute a processed method invocation request (step 1730). If this is the case, the control server software component 1334 executes a process that signals the asynchronous method server (step 1735) and completes processing (step 1799 in FIG. 17B).

As explained above, the preferred implementation of this invention can operate both with applications written to take advantage of the features of this invention, or previously-written applications that have been modified for us with the preferred implementation. In so writing or modifying asynchronous applications to operate with the preferred implementation, a user includes program code that, in part, recognizes these asynchronous signals and, as described below, registers these signals and the following processed method invocation requests in queue. These operations are described below with reference to the processes performed by the dispatcher software component 1332.

If no other function has been requested, the control server software component 1334 determines whether the control server message indicates that the invoker software component 1236 is requesting that a new application, which resides on the same platform as the control server software component 1334, should be started to become a method server to process a method (step 1740 in FIG. 17B). If so, then the control server software component 1334 checks the control server registry 1425 (step 1745) to determine whether the method executable of the new application, corresponding to the resolved method, resides on the selected platform (step 1750).

Control server registry 1425 has a local scope so that only the server platform 1300 is aware of resident method executables. The registration of method executables in registry 1425 involves registration of the actual executable code in executable files, for example shell scripts, that implement a method, and the status of those method executables. These items preferably have only a local registration scope because it is not necessary to manage the executable code globally.

If the corresponding method executable is identified in the control server registry 1425, then the selected platform can be a server platform. The control server software component 1334 executes a process to start the corresponding method executable and registers the resulting method server with the server registration facility 1420 and with the control server registry 1425 to indicate that the newly started method server is both running and available (step 1752). During this starting process, the control server software component 1334 also creates a context object data base capable of being used by the started method server. Next the control server software component 1334 then generates a message indicating that the application corresponding to the resolved method has been started and is now a method server (step 1754). This message is then transmitted to the invoker software component 1236 that requested that the method server be started (step 1790), and the control server software component 1334 has completed its processing (step 1799).

If the method executable corresponding to the resolved method is not identified in the control server registry 1425, then the control server software component 1334 generates an appropriate message indicating that the method executable was not started (step 1756). This message is then transmitted to the invoker software component 1236 that requested that the method server be started (step 1790), and the control server software component 1334 has completed its processing (step 1799).

If no other function has been requested, the control server software component 1334 determines whether the control server message is a request from the invoker software component 1236 for information concerning the availability of a running method server to execute a method identified by the resolved method (step 1760). If not, the control server software component 1334 generates an error message (step 1780), transmits that message to the invoker software component 1236 (step 1790), and completes its processing (step 1799).

Otherwise the control server software component 1334 retries the requested information on the running method server from the control server registry 1425 (step 1765). If the information from the control server registry 1425 indicates that the method server identified by the resolved method is available (step 1770), then the control server software component 1334 generates a message indicating the method server's availability (step 1775). This message is then transmitted to the invoker software component 1236 (step 1790), and the processing of the control server software component is complete (step 1799).

If, however, the control server registry 1425 indicates that the method server is not available (step 1770), then the control server software component 1334 generates a message indicating the unavailability of the method server (step 1777). The control server software component 1334 then transmits the generated message to the invoker software component (step 1790), and the processing of the control server software component 1334 is complete (step 1799).

(4) Dispatcher Operation

The process of dispatching method servers consists of dispatching methods to be processed by method servers and transport level communications. The dispatcher software component 1332 also handles different types of method invocations.

Asynchronous method invocations do not require that the client application wait for the identified method server to complete processing. For example, the invocation request can be placed on a queue to be performed, and the RPC transport level call can return to the invoker software component 1334 and allow the client application to continue its own processing without being "blocked" or prevented from continuing. The queue of processed method invocation requests received from invoker software components is then examined by dispatcher software component 1332, such as in a dispatcher procedure 1800 of FIG. 18, and performed according to a predetermined order.

Asynchronous method invocations may be requested if the client application does not expect to receive back a response of whether the method invocation was successfully received by an ACAS software component on a server platform. The response does not indicate whether the execution was successful, and will not contain any outputs of the actual method invocation, as it could for synchronous method invocations.

Synchronous method invocations are the default mode for all method invocations. With synchronous method invocations the client application that invoked the method awaits a response before continuing its own processing.

Figure 18A:
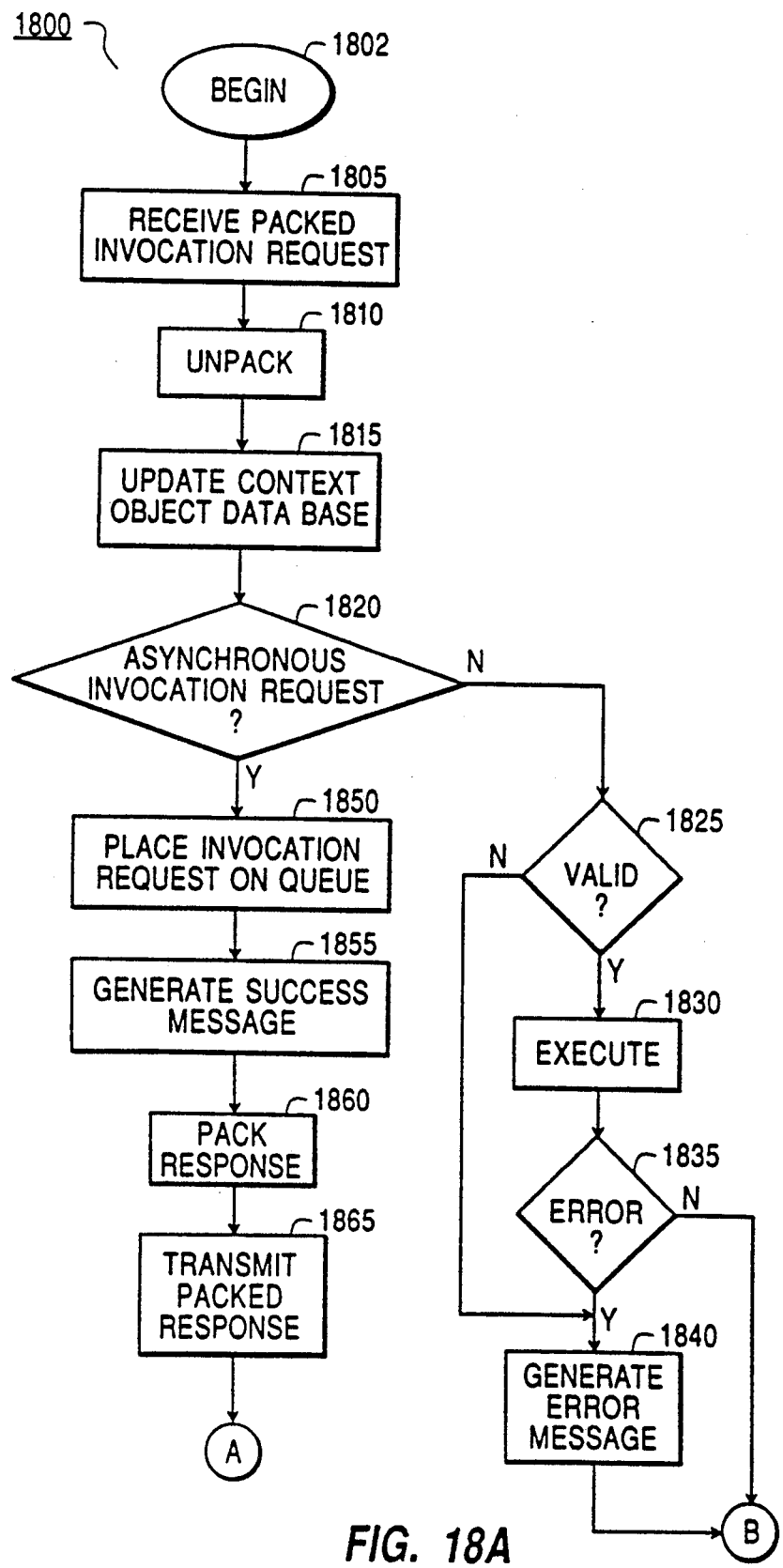
FIGS. 18A–18B are a flow diagram of the steps performed by the dispatcher software component in FIG. 14.
Figure 18B:
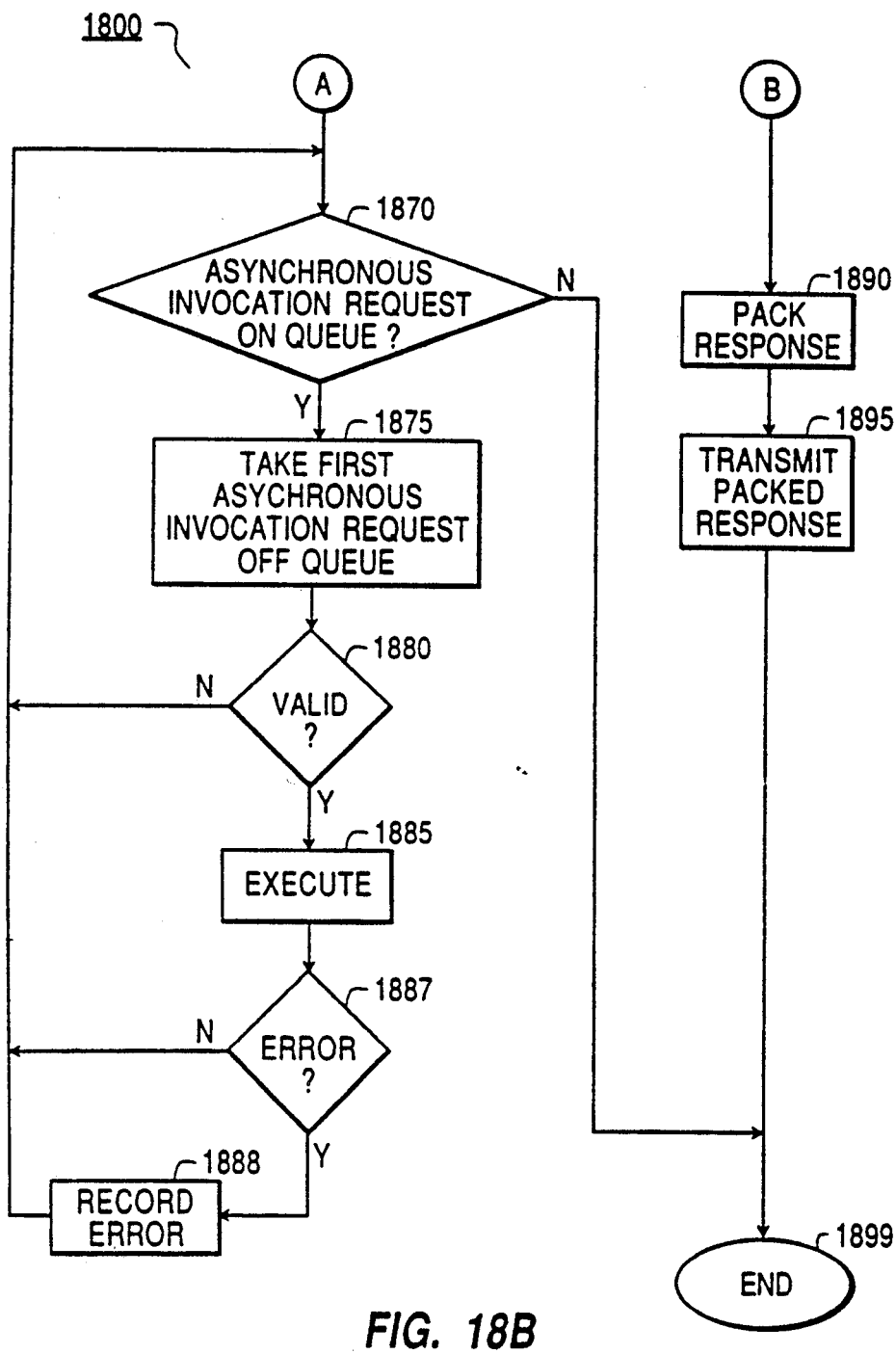

FIGS. 18A and 18B are a flow diagram of procedures performed or called by the dispatcher software component 1332 of FIGS. 12 and 14. The dispatcher procedure 1800 represents the steps 1385, 1390, and 1395 (FIG. 13) performed by the dispatcher software component 1332.

Prior to entering the dispatcher procedure 1800, the dispatcher software component 1332 is in a "wait" state waiting for a processed method invocation request from an invoker software component in the network. After beginning the dispatcher procedure 1800 (step 1802), the dispatcher software component 1332 receives a transport data structure, via the network transport service. This transport data structure represents a packed and processed method invocation request transmitted by an invoker software component in the network (step 1805). After receiving this transport data structure, the dispatcher software component 1332 unpacks and translates the transport data structure into a data structure recognizable by the server platform (step 1810). The dispatcher software component 1332 then updates a context object data base associated with the running method server (step 1815). A context object data base may become associated with the running method server either by being created by the control server software component 334 when starting the method server or by a user logging onto the server platform and starting the method server.

The dispatcher software component 1332 next asks whether the proceed method invocation request it received is an asynchronous invocation request to be processed by an asynchronous method server (step 1820). If not, then the dispatcher software component 1332 asks whether the invocation request includes the identification of a valid method, which is a method that can be processed by the method server (step 1825). If not, then an error message is generated (step 1840), which is then packed as a response (step 1890 in FIG. 18B) and transmitted to the invoker software component (step 1895) before completing the dispatcher processing (step 1899).

If the invocation request included the identification of a valid method (step 1825 in FIG. 18A), then the dispatcher software component 1332 dispatches the valid method identified by the received invocation request to be executed by the method server (step 1830). If an error occurred during the execution of the valid method by the method server (step 1835), the dispatcher software component 1332 generates an appropriate error message (step 1840). The dispatcher software component 1332 then packs the error message as a response (step 1890 in FIG. 18B) and transits the packed error message to the invoker software component (step 1895) before completing the dispatcher processing (step 1899).

If no execution error occurred (step 1835 in FIG. 18A), then the dispatcher software component 1332 packs a response (step 1890 in FIG. 18B), which in this case is the processed method invocation request including any output from the method server that processed the method identified by the resolved method (step 1560 of FIG. 15A). After the response is packed, it is transmitted to the invoker software component that originally sent the original processed method invocation request (step 1895), and the dispatcher processing is completed (step 1899).

If the processed method invocation request received by the dispatcher software component is an asynchronous invocation request (step 1820 in FIG. 18A), then the asynchronous invocation request is preferably placed on a queue to be dispatched by the dispatcher software component 1332 to be later processed as a method server (step 1850). A message indicating the success of the asynchronous invocation request is generated (step 1855), packed as a response to the received processed method invocation request (step 1860), and then transmitted to the invoker software component that originally sent the processed method invocation request (step 1865).

In the preferred implementation, asynchronous method servers execute asynchronous method invocation requests in the order they are first placed on a queue. In executing the asynchronous requests, the dispatcher software component 1332 asks whether there are any method invocation requests on the queue to be processed by the asynchronous method server (step 1870 in FIG. 18B). If there are no method invocation requests on the queue (step 1870), then the dispatcher processing is complete (step 1899).

If there were asynchronous method invocation requests on the queue (step 1870), the dispatcher software component 1332 takes the next asynchronous method invocation request off of the queue (step 1875). If the request taken off of the queue is invalid (step 1880), such as a request that cannot be processed by the method server, then processing returns to find out whether there are other queued method invocation requests (step 1870).

If the request taken of the queue is valid (step 1880), then the dispatcher software component 1332 dispatches the asynchronous method invocation request taken off the queue to be processed by the asynchronous method server (step 1885).

The question is then asked whether an error occurred in the processing of the method server (step 1887). The error, if any, is recorded (step 1888) then, or if an error did not occur, the dispatcher software component 11332 checks the queue (step 1870). In this manner all asynchronous invocation requests on the queue are processed, in turn, without blocking the client application that originated the method invocation request.

I. Summary

The present invention thus provides an efficient and simple manner for an application on one platform to invoke an application on the same or a different platform without needing to know details about the other platform, or even about the other application. Such invocation can even take place between unlike platforms in a heterogeneous network.

Because, in accordance with the object-oriented techniques of this invention, the data (or instances) and applications are not managed, those data and applications can be managed in the manner chosen by the application developers. By managing only objects and references to applications instead, the requirements on system resources are reduced, and the flexibility of the system is increased.

Persons of ordinary skill will recognize that modifications and variations may be made to this invention without departing from the spirit and scope of the general inventive concept. This invention in its broader aspects is therefore not limited to the specific details or representative methods shown and described.

We claim:

1. In a data processing network which includes a plurality of applications capable of performing operations on instances and capable of sending and receiving messages including identifiers for instance and types of operations, a plurality of instances corresponding to each of said applications, and a plurality of platforms operating under the control of operating systems for executing said applications, a system for organizing communication among said applications in an object-oriented manner comprising memory in the network containing a data base, said data base including a plurality of method entries, each of said method entries corresponding to one of said applications and containing a reference to a means external to the data base for invoking a procedure to allow that application to perform a specified operation on a specified instance, a plurality of non-redundant class entries, each of said class entries containing information about a class consisting of one or more instances which share common characteristics and further containing an identification of one or more message entries, and a plurality of message entries, each of said message entries specifying information about the types of operations which may be performed on selected instances and further containing a reference to one or more method entries, the message entries identified in each class entry containing information about the types of operations which can be performed on instances associated with said class entry, and the method entries identified in each message entry containing information relating to applications capable of performing the types of operations specified in said message entry;

data base control means coupled to the memory in the network including means, responsive to a message from a client application, for selecting the class entries and message entries associated with the instance and type of operation identified in said message, means for selecting a method entry referenced in the selected message entry and corresponding to the requested application, means for selecting a platform capable of executing the requested application, and means for transmitting the identifier for the instance and the reference to a procedure contained in the selected method entry to the selected platform; and, an object definition facility coupled to the memory in the network, wherein the data base includes a global class portion which is accessible throughout the network and local portions which are each accessible to only a portion of the network, wherein the data base control means includes means for searching the local data bases in a predetermined order before searching the global class data base, and wherein the object definition facility includes means for generating globally unique identifiers for types of operations and instances.

2. The system of claim 1 wherein method entries are referenced in each of the message entries by means of a method map.

3. The system of claim 1 wherein each of the method entries includes a list of attribute values describing the corresponding application.

4. The system of claim 1 wherein the class entries or method entries are hierarchically ordered into superclasses and subclasses such that the ones of the class entries or method entries which represent subclasses of a corresponding superclass inherit the information about the corresponding superclass.

* * * * *